US008972845B2

(12) United States Patent
Wu

(10) Patent No.: US 8,972,845 B2
(45) Date of Patent: Mar. 3, 2015

(54) METHOD FOR IMPROVING DOCUMENT REVIEW PERFORMANCE

(76) Inventor: Jianqing Wu, Beltsville, MD (US)

( * ) Notice: Subject to any disclaimer, the term of this patent is extended or adjusted under 35 U.S.C. 154(b) by 108 days.

(21) Appl. No.: 13/527,581

(22) Filed: Jun. 19, 2012

(65) Prior Publication Data

US 2013/0013996 A1     Jan. 10, 2013

(51) Int. Cl.
*G06F 3/048*     (2013.01)
*G06F 17/30*     (2006.01)

(52) U.S. Cl.
CPC ............................... *G06F 17/30011* (2013.01)
USPC ........... 715/227; 707/751; 707/736; 707/737; 707/738; 707/740

(58) Field of Classification Search
CPC .............. G06F 17/30; G06F 17/30011; G06F 17/30002; G06F 17/30309; G06F 17/30336; G06F 17/30327; G06F 17/30613
USPC ............... 715/227; 707/608, 200, 999.2, 736, 707/737, 738, 740, 751, 758
See application file for complete search history.

(56) References Cited

U.S. PATENT DOCUMENTS

| | | | |
|---|---|---|---|
| 6,650,794 B1 * | 11/2003 | Aoki .............................. | 382/306 |
| 7,043,489 B1 * | 5/2006 | Kelley ................... | 1/1 |
| 8,612,446 B2 * | 12/2013 | Knight et al. ................. | 707/737 |
| 2004/0260876 A1 * | 12/2004 | Singh et al. .................... | 711/117 |
| 2006/0212142 A1 * | 9/2006 | Madani et al. ................. | 700/49 |
| 2006/0282468 A1 * | 12/2006 | Crivella et al. ............ | 707/104.1 |
| 2007/0043774 A1 * | 2/2007 | Davis et al. .................... | 707/200 |
| 2008/0222108 A1 * | 9/2008 | Prahlad et al. .................... | 707/3 |
| 2009/0150827 A1 * | 6/2009 | Meyer et al. .................... | 715/810 |
| 2009/0157759 A1 * | 6/2009 | Kunisaki et al. .............. | 707/200 |
| 2010/0088132 A1 * | 4/2010 | Parkes et al. ..................... | 705/7 |
| 2010/0312725 A1 * | 12/2010 | Privault et al. .................. | 706/12 |
| 2010/0325102 A1 * | 12/2010 | Maze ............................ | 707/722 |
| 2012/0179696 A1 * | 7/2012 | Charlot et al. ................ | 707/750 |
| 2013/0262476 A1 * | 10/2013 | Barak et al. ................... | 707/748 |

* cited by examiner

*Primary Examiner* — Boris Pesin
*Assistant Examiner* — Justin Lee
(74) *Attorney, Agent, or Firm* — Jianqing Wu

(57) ABSTRACT

The present invention is a method and system for accurately coding documents for a legal matter. The method, if used by experienced and motivated document reviewers, has the potential to dramatically improve adjusted review consistency, reduce coding errors, and produce the best review product. The method can also result in useful case history files, which are useful to litigation attorneys in every phrase of litigation including motion argument, merit trial, appeal, and future litigation.

20 Claims, 10 Drawing Sheets

Add Records To Master Table

Server Response: Record 13 was entered at 05/10/2009 10:35:06

Date format: MM-DD-YYYY ← 618

- Table: Terms
- Scope Effect: Original
- Sub-Type: NA
- Key (<80): CDMA
- Date: (default is system time)
- Comment (<300): It means code division multiple access. It is a method in wireless access.

[Interactive search] [Submit] [Cancel]

FIG. 12

Interactive Search: Global Search Result

| Txt | | | Sorted by | Alphabetic |
|---|---|---|---|---|
| | | | ← 620 | |
| Text | terms | | All Text files with txt extension | ← 621 |
| Smith, John | names | Client | Tabble, Euble, and Taudle (TXT) [tentative] | |
| Sales data | coding | Amend | Exclude BN12012, see specification.txt | |
| Sales data | coding | Amend | Produce BN12010, see specifiation.txt | |

[Enter New Record] [Global Search] [Confirm Data] [Close]

FIG. 13

| | | Index Table: Change Histories | | | |
|---|---|---|---|---|---|
| | Filters | All Tables ▼ | | ← 622 | |
| Date | Keys | Coding Eff. | Scope Effect | Comments | |
| 05/12/09 3:12:01 | Sales Data | NR | Original | NR, if in commission report | |
| 05/12/09 4:11:21 | Sales Data | NR | Amend | NR, if in commission report unless it discusses M series | |
| 05/11/09 6:11:21 | Smith, Ted | Attorney | Original | Attorney for Green Bay. Also, known as STS | |
| 05/01/09 4:01:01 | P series | NR | Amend | Read request 16 to exclude P series machines | |
| | | Close | | | |

FIG. 14

METHOD FOR IMPROVING DOCUMENT REVIEW PERFORMANCE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to document review method, and in particular, to the method for improving document review performance.

BACKGROUND OF THE INVENTION

Discovery is a process by which two parties in legal proceeding exchanges information, exhibits and documents according to specific rules of procedure. In a typical legal proceeding, a party ("requesting party") may, pursuant to procedural rules, send a document request to another party ("responding party") to compel the responding party to produce documents that contain many categories of subject matters. The responding party reviews potential documents, identifies documents containing any of the enumerated categories of subject matters, and produces them for the requesting party. Historically, the responding party reviewed paper documents, copied responsive documents, and produced them for the requesting party. Information technologies have caused companies to use electronic documents and thus. It is necessary to use an Internet review platform for the review of documents. In a typical document review, the representing law firm or the client retains a data company for providing data hosting services and retains contract attorneys ("the reviewers") from employment agency to review documents on client computers. The reviewers can access the server of the review platform and download documents one by one for review.

The need for document review may arise from all kinds of causes such as civil actions, securities litigation, patent infringement, product liability claims, administrative actions, merger acquisition approvals, governmental investigations for statutory violations (violation of Foreign Corrupt Practice Acts), criminal actions, compliance reviews, and internal due diligence reviews. Different legal procedures and substantive laws require the responding party to produce different types of documents. As a result, there is no universal procedure for processing documents. Each review project requires unique tasks for the project manager and the reviewers. Each type of cases may require unique discovery process.

The documents sought by the requesting party depend upon the nature of claim and thus vary considerably. When a corporation acquires another corporation, the acquisition transaction may be subject to approval by the Department of Justice. This type of review is very unique in that the government only looks for possible antitrust violations. In nearly all cases, the government focuses on three types of relevancy: relevant products, relevant market, and relevant time. The reviewers must pay attention to any documents, which could raise antitrust concerns. In class actions, discovery is the most contentious. Disputed issues may revolve around looting, fraud, and failure to disclose important information. In patent infringement cases, issues may be patent validity, patent misuse, and inequitable conduct. Document review for this kind of cases requires the reviewers to identify infringing products and services.

In the case arising from government investigation, the government may issue subpoena to compel a corporation to produce certain documents. The kinds of documents requests vary from case to case although documents sought in the same type of cases often include certain similar documents. Some of the cases may arise under the law regulating communications, stockbrokers, and investment advisers. Some investigations may be focused on specific issues. Thus, document requests will be revolving around those issues. Other cases may require broader investigations. For example, if an investigation is focused on the accuracy of a submitted declaration, the focus of discovery will be on the declaration. If an investigation is directed at a specific kind of advertisements such as using fax, web mail, or bulk email, discovery would focus on those issues. Discovery tasks may include a search for finding documents that are concerned with advertisement methods. Some investigation cases arise under the Foreign Corrupt Practices Act, which prohibits corporations from giving anything of value to the officials of foreign governments. When a company is under investigation for violating this federal statute, review is focused on how money or gifts are used to improve business opportunities.

Internal due diligence review may be conducted to find internal misconduct such as looting, embezzlement, and steeling. For example, when a bank discovers that someone may have stolen or embezzled money, the bank may conduct an internal investigation. While such discovery does not always work, it is a proper step for finding some useful leads for an answer. Due diligence review is conducted for various other purposes. When a company is to acquire a business or a substantial amount of its assets, the acquiring company may have to conduct necessary investigation of the acquired company so that it can make an informed decision. The investigation is conducted to ascertain potential liabilities, outstanding debts, assets, revenues, cash flow, and intellectual properties.

Objectives of document production vary, depending upon the nature of cases and other factors. Regardless of the complexity of legal issues, the final objective for each document production project is to produce just enough documents to meet the requirements of the document request or subpoena and identify the documents that support the claims or defenses. However, due to the dynamics of litigation, the parties must consider additional objectives, which include producing a document database that is capable of scaling up and down and which will be useful in a later stage of litigation. Another common objective is to produce documents at the lowest costs possible.

All client companies make different products and sell different services. Thus their documents contain completely different substances. Despite their differences, they documents contain (1) information on a large number of projects, services, and processes, (2) the strange codes or casual names of products, services, and materials, (3) a large number of players such as employees, customers, attorneys and consultants, and other parties, (4) technical subjects of varying complexity, (5) jargon, abbreviations, and acronyms, (6) assumptions only understood by the sender and intended readers, (7) incomplete person names, place names, and discussion topics that can be understood only by involved people, (8) protected compressed and zipped files, (9) trade secrets protected by passwords, and (10) substance in one or more foreign languages. Due to any and all of those reasons, document review is not an easy task.

Corporate documents contain a large number of duplicates. A large number of duplicate documents arise from their document distribution practice, archiving, file backup, drive backup, media backup, and server backup. A document may be distributed to several, tens, and hundreds of employees. Some documents may be amended from time to time and sent to a large number of employees as updates. Each of the documents may be backed up by many ways, including file backup, drive backup, media backup, and server routine backup. Certain documents may have thousands of copies while other documents may have only tens to hundreds of copies. The large number of documents is primarily responsible for the high review cost.

Due to the large number of computer applications for creating documents and complex file histories, some documents cannot be properly processed for review. Documents cannot be opened due to (1) lack of supporting applications, (2) association with a wrong application, (3) missing necessary file components, (4) being linked to an unavailable file, (5) incorrect encode in the text in foreign languages, (6) corruption in its file structure, (7) infection by virus, and (8) lost part of information or damaged file structure. It is not always easy for reviewers to ascertain whether a document has a real technical problem. When a great number of documents cannot be opened, it is a disaster. The only possible solution is to find original documents. Documents incorrectly marked as technical problems may be routed back to reviewers for another round of review.

Many large corporations are doing business worldwide. As a result, corporate documents are written in different languages, depending upon geographic region where the documents are created or the authors and intended readers. Some documents are written in foreign languages, others contain foreign languages between lines, and yet others contain English translations. Some documents may be written in more than one language. It would be very difficult to have those documents reviewed. They go through several rounds of reviews. If such documents are important, they are translated to English.

Password protection of documents adds further complications. Passwords protected documents often appear in the document pools of software companies and technology companies. This class of documents can significantly reduce review speed. It is often difficult or even impossible to find right passwords. In many times, the reviewers treat such documents as trash or technical documents. The parties in civil litigation may reach an agreement on how to treat those documents. Now companies use zip files to send corporate documents by email. A zip file may contain tens to hundreds of files. Some zip files may contain database files or spreadsheets.

Document production is further complicated by unpredictable changes inherently in litigation. Litigation need frequently requires law firms to change every possible instruction including review standards, request definitions (specification definitions), coding rules, and different ways of handling of documents. The large number of documents in a review pool makes this matter even worse. Any fixes, adjustments, and corrective review would require a great deal of review time. The whole production process is full of changes, adjustments, fixes, quality checks, corrective reviews, and special reviews. The current electronic document review model, an extension of the conventional discovery model, lacks flexibility for handling dynamic changes. On top of so many complicating factors is the diversity of people involved. For any review, the parties involved include the client, litigation attorneys, project managers, document processors, staffing agency, and document reviewers. One single bad communication between any of them may result in an error that might require a massive corrective review.

The massive amount of case information, a large number of file types, commingled foreign languages, and prevalent technical problems are directly responsible for poor performance and unmanageable discovery costs. Many additional factors such as poor review plan, reviewers' inability, confusing review instructions, missed applications on client computers, poorly-worded definitions in the coding pane, bad structures of coding tree, and unavailable passwords are among other factors contributing to poor performance.

Because of the nature of documents, document review is a slow learning process. Meaningful review is not possible in the early stage of review even by experienced reviewers. When a reviewer learns more and more about document substances, the reviewer can substantially improve review quality and increase review speed.

Other problems such password protection can waste much more time. An operation from file selection, downloading, to unzipping the file can waste as much as 10 minutes per document. Moreover, whenever a reviewer is unable to open a document, the reviewer waits for help or repeatedly tries the same operations. The time wasted from this is much difficult to assess. Documents routed to a wrong destination must be routed back and forth without final resolutions.

In a classic document review model, documents are collected to form a review pool, and they are reviewed to identify those documents, which contain substances falling in one or more categories of the request. The definitions of the categories are provided in the document request. One of the document requests in a patent infringement case may be "any and all documents that discuss, mention, and relate to the patent in suit." The document request may contain several to nearly hundred specific requests. The reviewers review all potential documents and find relevant documents. Those responsive documents then are further reviewed to determine if they are privileged and thus withheld from being produced. The review platform has a review tag database table for storing coding decisions such as responsive or non-responsive, privilege or not privileged. For a document that is responsive, the reviewer checks the responsive tag and all other applicable tags for the document. In addition, the reviewer may determine if a document is hot (Hot documents are those that are very important to the case) and code it accordingly. Responsive and non-privileged documents are produced optionally with a production log identifying each of the produced documents. The production log may contain only limited information for identifying each produced document.

Information technologies have caused companies and businesses to produce extremely large document pools, which can comprise more than a millions documents. Thus, reviewing and producing documents by the conventional manual method are no longer practicable. The e-discovery industry has become a big industry that a large number of companies are involved. The main areas of services include data collection, data processing, documents hosting, software development, employee staffing, training and consulting, and document review.

Since the deployment of Concordance, more than two dozens review systems have entered into the market. Each platform consists of a server and server application and plural terminal computers connected to the server. Well-known review platforms include Concordance, Applied Discovery, Iconect, Stratify, Ringtail, Introspect, Attenex, Summation, and Case Central. Each review platform comprises a server for loading and processing data and for sending documents through the Internet to a plurality of client computers where the documents are reviewed one by one. As shown in FIG. 1, each of the review platforms interact with document reviewers through a review user interface which comprises a document coding pane 100, a document list pane 110, a document view pane 120, and document advancing buttons 130. Regardless of the review platforms, the basic concept is the same. First, documents from one or more custodians of the responding party are collected and stored on a server. Hard copies of documents are scanned and saved as suitable image files. Electronic documents are converted into image files such as Tiff, PDF, and PNG. Certain electronic documents may be converted into text files by optical character recognizing software, while the files in their native formats and text formats are also available for download during review. All documents are loaded onto the server. They deliver electronic documents to review terminals in text, html, TIFF, PDF, or native files.

The files are indexed according to certain scheme, which is mainly for the convenience of assigning reviewing tasks to plural reviewers and tracking documents' processing statuses. Documents may be retrieved using specific search keys or by other specific processing methods. On some review systems, documents may be displayed as files in one parent folder on the review Browser of the client computer. Documents can be assigned to different reviewers by virtual folders or numbers' ranges. On other platforms, documents may be assigned to plural reviewers by assigning documents by a start and end bates numbers. They may be presented to reviewers in an order consistent with their consecutive bates numbers.

Plural reviewers review documents from client computers that are connected to the server. Usually, each of the reviewers can log into a personal review account and open an assigned folder or document range to review documents. If the platform allows plural reviewers to review documents by ranges, each of the reviewers must go to the start document number of his assigned document range. Each of the review platforms has at least two panes: one for viewing the document and one for marking the document (often known as "tagging tree"). They also have a pane for showing all documents in a list. In reviewing documents, the reviewer opens a document on the document pane, reads the document, and conducts required analysis. Upon finishing reading the document, the reviewer clicks all applicable check boxes on the tagging pane according to review instructions. Each of the check boxes, also known as "tags," is associated with one of the categories or definitions. For example, the tagging tree on the tagging pane may contain the following checking boxes and definitions: [X] None-responsive, [ ] Responsive, [ ] Hot document, and [ ] Privileged document. Some of the tags may have many sub-classes of tags associated with specific definitions. The number and natures of definitions used in each case are unique and may be completely different from what are used in other cases. Thus, the server must allow a project administrator to set up and modify the tagging tree for each project. The reviewer may write a note for a document in an annotation field associated with the document. After the reviewer finishes the first document, the reviewer clicks a submission button. This process causes the server to write the values for the selected tags into the database for the document and causes the server to load next document. The reviewer repeats the same process in reviewing next document.

Responsive review may be conducted a second time as a quality control. Reviewing the documents, which have been marked as non-responsive, is not always conducted. However, a second review of responsive documents is common. Privileged documents will be subject to further reviews by a privilege team for final determination of the privilege status. When a document is determined as privileged, it is removed from the responsive pool and placed in the privileged pool. A log is produced showing document identities such as creator, addressee, other recipients, date of creation, privilege basis claimed, and brief description of the subject matter. Privilege review may be conducted twice or more. In addition, responsive documents are also reviewed for significance (hot document review). Separate review for hot documents may be used in highly contentious cases.

A typical production project may comprise two responsiveness reviews, one or two privilege reviews, one optional hot document review, creation of privilege log, and creation of hot document log. The total number of reviews can be more than five. The reviewers may conduct corrective review for documents that contain detected errors and inconsistencies or contain potentially useful or harmful substance. Other tasks include proofreading document log, proofreading privilege log, removing documents from a privilege log, reviewing documents produced by adverse parties, searching specific information in the documents produced by adverse parties, tabulating information from the documents produced by an adverse party, searching public records, constructing database data for events, acts, and conducts, constructing attorney's name table for privilege review, analyzing the substance of found documents. This list is not exhaustive, and the nature of tasks can only be defined by the need of litigation.

In addition to a broad spectrum of potential tasks, the unpredictable nature of litigation makes discovery project even more difficult. A change in the document request, a negotiated settlement on discovery scope, change of client's objective, filing of new claims and new defenses, entering or exiting of parties in the case, ruling of a motion, and settlement of claims can totally change the discovery plan, the scope of review, the custodians' number, coding tree structure, coding rules, and the handling of specific documents. Therefore, the costs for contentious case cannot be predicted.

Review of corporate documents is a difficult task because the subject matters in corporate documents may be about anything under the Sun. They may be written at any technical levels. Documents may contain a large number of special acronyms, terms and expressions, unfamiliar product numbers, short product names and requests, people's names, unfamiliar transactions, incomplete names of places and locations, and unstated or implied assumptions. Accordingly, documents are not readily understandable to anyone who is outside of the discussion cycle. Reviewers constantly struggle to understand unfamiliar terms, transactions, events, locations, and persons. If the task of e-discovery is to review old documents for a corporation whose staff has been changed completely, the current staff can do little to help reviewers understand what was written on the old documents.

Document production cost is a major part of litigation cost due to the large volume of documents to be processed. The costs for processing documents is anywhere from $1 to $15. If a client has one million documents to be reviewed and processed, the total production cost would be from $1 to $15 millions. For a large review project involving a hundred reviewers who work 10 hours a day at the billing rate of $150 per hour, the total fee would be $150,000 a day. If each of the documents needs 2 minutes on average, billed at $150 per hour, the total costs for this component alone could be $5 million. A document review for a merger may cost several millions and a due diligence investigation can cost tens of millions of dollars. Certain time-intensive tasks could cost considerable more. Those tasks include writing summaries for documents, translation of foreign language documents, and creation of a detailed production log, and producing privilege log and hot document log. A considerable amount of time is consumed in discovering review problems, conducting corrective reviews, and conducting additional review required by litigation needs.

The total costs for a review project is the sum of the costs for reviewing each document. The cost for reviewing each document directly depends upon the time used for each document. The time for reviewing a document comprises (1) the time for loading the document, (2) the time for reading the document, and (3) time for analyzing the document, and (4) the time for coding the document and saving document. If the time for loading a document is 1 second per document on average, the total cost could be 150*(1*1,000,000)/3600=$41,700 assuming that reviewers are billed at the rate of $150 per hour. Thus, when a law firm uses a network speed at 1 minute per document, the bottom line price would be $3.3 million. This time component depends upon the design features of the review system, maturity of the operating software, the availability of supporting applications, and sustained bandwidth for each client computer. A review platform, by feeding a massive number of illegible documents, alone can double or triple review costs. The second time component has a lot to do with the experience of reviewers and familiarity with the case. A reviewer with considerable experience in the field and knows the language context need less time to read the document. In contrast, an inexperienced or new reviewer may need more time to read the document. The third time component depends upon reviewer experience, the amount of case information, the nature of legal matter, and the complexity of legal issues. The last time component depends upon system design of tagging pane, coding logic, the client computer, and network speed. Impossible, confusing, and conflicting coding logic will cause reviewers to struggle. This component largely depends upon the design features of the review platform. Other factors, which can make this problem worse, include slow network speed, limited bandwidth, and the layout and design of review user interface. Anything that affects individual's review time will affect the total cost.

Documents may be reviewed in one to as many as ten rounds. The total cost is approximately proportional to the rounds of reviews. Anything that affects individual's review time and the number of reviews will affect the total cost. A great number of parameters can affect the total cost of a document production project. Any problem with any of the factors can substantially increase production costs. For example, a bad review platform may lack tools for performing tasks productively; inexperienced reviewers need more time to review documents; poor network condition takes longer time to download documents; a bad review plan may use more review passes to perform same tasks; and bad management may result in more errors responsible for corrective reviews, and sudden changes in litigation needs may require a corrective review.

Another reason for high costs is the time needed for conducting corrective review and fixes. Many of large production projects have more than a million of documents. While most of the documents allow project mangers to track the review status in some way, but it is not always easy to track them in all the times. Documents are reviewed and processed, their production log, hot log, and privilege logs are constructed, and further reviews are conducted to meet changing definitions. A quality control at any stage or on any work products may reveal a mistake, but it is not easy to correct the mistake. The mistakes and inaccuracies may find their ways to the document pools, the production log, the privilege pool, the privilege log, and hot document log. Certain mistakes such as omitted documents can be fixed without the need for checking the whole process. Some mistakes such as using incorrect definitions, using wrong tagging conventions, omission of required tasks, and use of a wrong analysis method are more difficult to correct. After a project has started for weeks and months, correction of such mistakes is by no means easy in practice. The task can be as tedious as picking up a few sands from a bowl of cooked rice. The cost can be very high if the only remedy for correcting the mistake is to conduct a corrective review for all suspected documents. Moreover, quality review and correction may have to be conduced for all affected work products such as the privilege log, the hot log and other special files. Entries may be modified in a log, added into a log or deleted from a log. Document production is an extremely time-consuming, extremely difficult, and extremely expensive task. Any small mistake is equivalent to waste of hundreds of thousands of dollars.

Great effort has been made to reduce the total discovery cost. Costs and review accuracy is intertwined. The highest accuracy can be achieved by spending unlimited time to review, study and examine each document. However, the accuracy must be achieved at reasonable costs and within a reasonable review time. One way to reduce the number of documents in the review pool in some cases is to conduct effective searches and to retrieve only certain documents to form the review pool. A well-designed search method may retrieve certain documents to build a document pool for review. Each of the documents is then subject to several rounds of reviews by the reviewers. Some computer search methods can reduce as much as 80% of documents. The deduced size of the document pool for review directly reduces the costs of production. Inability to remove junk documents is one of the reasons for high production cost.

To further reduce the costs, some companies have developed computer algorithms for automatically coding documents. Same sample documents are reviewed to identify keys and key matrix and they are used to search documents. Based upon whether certain keys and key combination are in documents, the server codes the documents accordingly. Such computer algorithms may reduce a great deal of costs but cannot used to code documents in contentious cases. Other algorithms may imitate the coding done by human for similar or related documents.

The whole review process is a learning process for learning massive case information. There are overwhelming new elementary facts and unknown or unfamiliar terms. After a reviewer spends a great deal of time to learn an elementary fact such as the infringing nature of a product denoted by a model number, each of the other reviewers will have to go through the same process to learn the same fact. There are a great number of such case facts must be learned by each of the reviewers in the whole team. In addition, when a reviewer does not have an opportunity to learn the elementary fact, the reviewer mostly probably makes a coding error for all documents containing the elementary fact. The document review industry has not recognized the need or importance of showing elementary work products in real time between all reviewers and there was no way for doing so.

The review site management understands the need to train reviewers in various methods to improve review quality. At document review sites, such information may be posted on a blackboard or clipboard for sharing. This effort is intended to identify coding problems and correct potential errors. Discussion meetings may be conducted on a daily or weekly basis. This method is, however, ineffective and inconvenient. Such oral communication is ineffective to discuss coding issues, and it is not intended to share elementary facts discovered by reviewers. Moreover, discussion by verbal dialog may increase communication errors. Some review sites have provided a questions-and-answers forum where the reviewers provide questions and the project managers will provide answers one day or several days later. Sharing information by using Window's share drive has been used as early as the birth of the windows operation system itself. However, this method presents several problems. First, such arrangement does not allow plural reviewers to write information to the same source and the operating system may lock up the file when one reviewer opens it. To avoid this problem, the reviewers must be allocated certain time windows to enter questions and waste a great deal of administrative time. Second, such a method cannot be standardized to implement many functions. Different cases may require totally different ways of organizing and sharing case information. Thus, the table can be implemented only by questions and answers. Finally, there is no suitable way to ensure that all information posted is accurate and reliable. Posting a piece of wrong information for sharing may cause other reviewers to make a wrong coding decision. As a result, only project managers and litigation attorneys can answer the questions. The method cannot be used to share elementary facts that may control coding decisions in many related documents. Additionally, it should be assumed that questions and answers be distributed by email, email attachments, web pages, or web page attachments. This method is available as early as the first day when web site technology is available. However, it is seldom used for the similar reasons. It cannot be used to share elementary facts real time, there is no proper way to ensure data accuracy if all reviewers can update the file or attachment.

SUMMARY OF THE INVENTION

The present invention is a process for facilitating collaborative work by all entities and parties in document review. It allows all players from litigation attorneys, document processors, project managers, and review attorneys to write down their instructions so that others players will know all respective instructions and thus avoid misunderstanding.

The present invention is a process for sharing work products in elementary levels during the entire review process. By using this process, the reviewers can share their work products, reuse elementary work pieces, and avoid conducting duplicate research, analysis, and fact-finding. As a result, it can avoid working on duplicate tasks and use the time to hunt for critical information.

The present invention is a process that allows the managing staff to instantaneously change their review standards, construction rules, coding rules, methods of treating documents, and elementary facts. By using this process, the whole review team can reduce the amount of time for fixes, reworks, and corrective review to the minimum theoretically.

The present invention is a process by which conflicting instructions between litigation attorneys can be minimized and avoided; different interpretations of same rules, instructions and guidelines by different reviewers can be minimized; conflicting and inconsistent treatments of documents can be minimized; coding errors from different understandings of the same rules and instructions as a result of reviewers' different experience can be minimized.

The present invention is a process by which each of the involved players can get instantaneous feedback concerning the review project. Experienced litigation attorneys such as partners, associates and staff attorneys can quickly know document composition, potential scope of responses, technical issues, hot issues, significant facts, files types, and the potential problems in the document requests. The real time feedback gives the litigation attorneys the earliest opportunities to make necessary adjustments to review protocol, review guidelines, request definitions, and coding rules.

By using the process, the litigation attorneys can make real time changes to any of the review aspects in any time and anywhere. They can change the scope of review, review guidelines, request definitions, coding rules, the threshold of hot documents, significant issues, important players, attorney list, and the treatments of special documents. Therefore, the process helps the attorneys meet the unexpected and surprising needs inherent in the dynamics of litigation.

The present invention is a process by which all parties can control the data integrity. No individual reviewer can enter factually wrong information to harm the whole project. Any facts, work products, analysis, and person names that are important to the case are subject to a rigid validation. After a basic fact is settled, the entire review team can trust it, share it, and use it. Yet, each of the reviewers can see only the information that the reviewers have a need to know and enter information the reviewer has a need to enter.

The present invention is a process that provides objective performance rating standard so that the performance of reviewers can be rated more objectively. Under the existing review system, the reviewers would be rated by subjective standards of less competent reviewers. Moreover, the performance of the reviewers can be judged in light of the changes in review guidelines, document requests, coding rules, and special instructions. This can improve the objectivity and fairness of performance evaluations.

The present invention is a process by which the review will be concluded with detailed changing histories concerning all aspects of the review. It may include document requests, review protocol, important terms, people names, transaction names, substantive rules, coding rules, and the reasons for the changes. Therefore, the history data created in the process will ensure the case to succeed down the road. The history data can facilitate unexpected changeover of law firms, litigation attorneys, document processors, and review attorneys. The history data will help the law firms meet unexpected needs more easily during motion hearing, merit trials, and appeals. The history data may also be used in the discovery of related cases of the client.

The invention is also a process that provides the most convenient forum for the cooperative discovery efforts between different litigation attorneys, between joint law firms, and between different reviewers. Thus, a review can be conducted in two or more sites in different cities and even different countries. They can share details as if they worked on the same site.

The invention is also a process, which reduces complicated coding rules, document requests, and elementary facts into data pieces dynamically. The transformation from a large number of coding rules, document requests, and elementary facts into data pieces is done before the review starts, but continue throughout the review process in real time. As a result of such transformation, reviewers have no need to remember all details. Yet, when a reviewer needs specific information on coding rules and elementary facts, the reviewer can get it quickly and conveniently.

One version of the present invention comprises the following operation steps:

(1) customizing at least one table for storing coding rules and elementary facts, specifically for any particular legal matter or legal proceeding;

(2) generating a document review user interface for reviewing documents by users;

(3) generating a discovery-assisting user interface, which comprises an interactive search page, which is able to display a coding rule and/or elementary fact that a user has selected during an interactive search, and allows each user to validate data records, enter data records, and/or conduct global searches; and (4) retrieving coding rules and/or elementary facts from the at least one table, associating a data-validating submission button with a coding rule or elementary fact shown on a search result page, validating coding rules and elementary facts for the at least one table, and adding coding rules and elementary facts to the at least one table, wherein, each user uses the discovery-assisting user interface to search coding rules or elementary facts from the at least one table, retrieve found coding rules or elementary facts for guidance in document review, and coding for documents under review and/or add coding rules or elementary facts in the at least one table for real-time share with other users.

BRIEF DESCRIPTION OF DRAWINGS

FIG. 12 shows the web page for adding a data record for an acronym to a database table.

FIG. 13 shows the web search-result page after typing a key and clicking the global search button.

FIG. 14 shows the web page showing an index table showing all cumulative changes and latest changes.

DETAILED DESCRIPTION OF THE INVENTION

A. Sources of Coding Inconsistency

Figure 1:
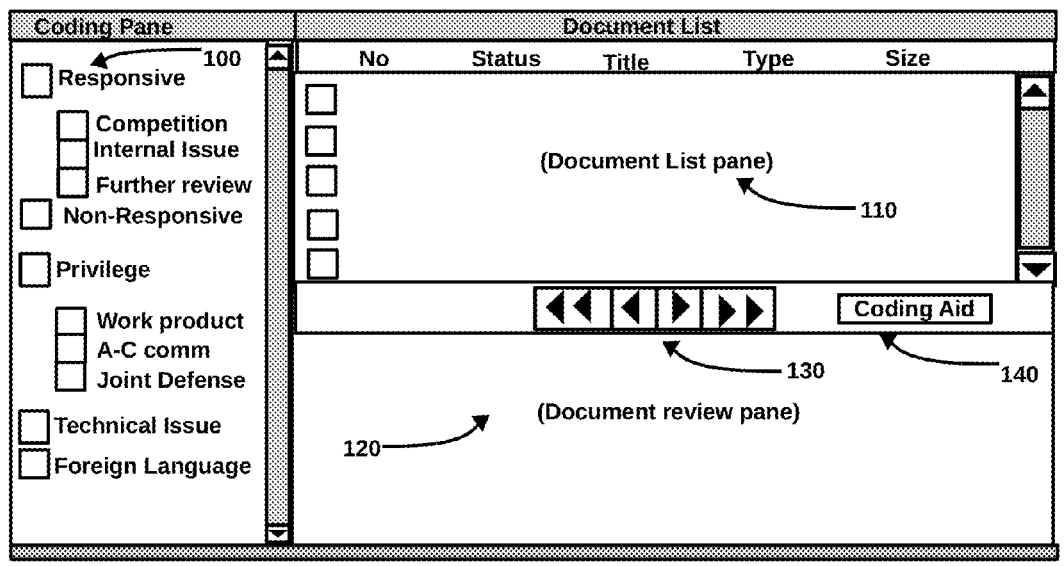
FIG. 1 shows the document review user interface for a typical document review platform.

A document can be coded correctly, arguably correctly, and incorrectly. Coding inconsistencies arise from many sources. A request might be "Produce all documents relating to the infringing products you manufactured from 2005 to 2009." A document revealing that a product uses the patented technologies falls within the scope. However, in reality, only a small number of documents would address its relationship with the patent in-suit. A large number of documents never provide enough details that allow the reviewers to make a sound coding decision and are coded incorrectly. The following is a brief discussion of the sources contributing to inconsistency and errors.

Improper Scopes of Document Requests.

The most important source contributing to coding inconsistencies and coding difficulties is the document request. When a drafter knows nothing about the composition of documents, the drafter cannot accurately define the scope of each request. Therefore, imagined definitions cannot be properly applied to the documents. Documents seldom contain indisputable labels that allow reviewers to identify them. They may be related to a product in all kinds of ways. A document may discuss, refer, or mention product logo, shipping invoice, product photo, flowchart for making it, product model numbers, material formula, package materials, quality control steps, quality control staff, production logs, shifts records, meeting memo, production records, and test data etc. In addition to different ways of relating to a product, a document may be related to any of those things in different degrees. A document may discuss it in depth, mention it briefly, refer to it by name, or refer to it by implication. The drafter does not know actual documents and thus is not in a position to draft the requests in a way of specifically including or excluding certain documents. By reading the scope of the requests literally, many requests may read on an extremely large number of documents that the drafter has no reason to care about.

In many document requests for a merger clearance, one document request (i.e., specification) is directed to research and development effort. The question is broad enough to literally read on anything in research and development in relevant products. When this request is propounded to a software company, it creates great confusion or impossibilities. In a typical software company, employees routinely create documents that concern identifying bugs, fixing existing programs, and improving existing algorithms. Their daily activities are similar whether they work on existing products, products under-deployment, products-under-test, and products to be developed. Moreover, a fix for a bug discovered on a customer site will be soon used in the product for future release. There is no rule that research and development cannot be directed to existing products. Their activities are similar whether they work on existing products and new products. There are no clear instructions on the scope of this request. By reading the request literally, it would reach most documents. In addition to lack of clear definitions, it is very difficult to tell which of the thousands of piece of code discussion is for product maintenance or which is for product development. After a large number of documents are coded as responsive documents, a much narrower reading of the request must be applied to reduce the number of responsive documents. The litigation attorney may change its application scope after negotiating with the drafter. The improper request scope has contributed a great deal to the coding inconsistency. When a request literally reads on substantially all junk documents, the reviewers have to figure out what the drafter wants. To avoid coding junk documents, the only remedy is to modify the request definitions or narrowly read the definitions.

Review sites sometimes provide broad hot definitions. As a result, the number of hot documents is overwhelming. When the hot tag field is filled with too many insignificant documents, this hot coding becomes useless. Now, neither partners and nor litigation associates have time to review the significant documents pool, which contains both significant and junk documents. If the litigation attorneys really want to find hot documents, they have to conduct further review to arrive at a manageable document number. To avoid improper scope, some law firms use flexible definitions like "any document you believe is so important to the case that the litigation attorney should know." In this case, the instruction drafter actually passes the judgment to the reviewers, who are in a better position to know what is important and what is not.

All the above examples show that request definitions cannot properly applied to documents and the request definitions are susceptible to different interpretations. Therefore, document review must take a trial-by-error approach. Some project managers may check work product to determine if request definitions are properly applied to documents. If a systematic problem is noted, a narrower interpretation may be given to the definitions in light of issues in dispute. Considering the fact that the drafter has absolutely no knowledge of the documents and requests are a product of imagination, the reviewers are in a better position to determine the scope. The reviewers must try to figure out the drafter's intention in light of the litigation objective. The requests primarily contribute to coding inconsistency and some coding "errors."

Coding Instructions Susceptible to Different Judgments.

Any words and phrases in request definitions are subject to different interpretations. When review instructions do not define any of the terms such as responsive, privilege, and clearly erroneous, each of the reviewers applies his or her own scope. Some reviewers may apply definitions literally, and other reviewers may consider materiality of substance. The interpretation of substantive definitions depends upon personal experience that the reviewers have acquired from other review sites. The reviewers may have different levels of case knowledge; and some may be able to see the significance of specific transactions, terms, or players in the document while other reviewers could not. Even words and phrases that appear to be clear can be construed in different ways under various circumstances.

Non-Obviousness of Inherent Properties for Determining Relevancy.

Many requests may call for documents containing substance of certain properties. One example is concerning the competitiveness of a relevant product in an antitrust clearance. The reviewers must determine what properties and features that affect product competitiveness. The competitiveness of a product is reflected not only in market shares, profit margin, and sales volume, but also in a large number of inherent properties. In the facial tissue industry, the profit of a product primarily depends upon its production costs. In oil and gas industry, transportation cost is a key factor for determining profit margin. The costs in information services such as web hosting, advertising, and network communications, are far less important. This is because the computers in those industries run whether they do business or not, but revenues depend upon if their systems are providing services. Sometimes, an innocent feature of a product may have a decisive impact on competitiveness. One example is the marketing company's ability to control virus and offensive materials in web site advertisements. If a display advertisement contains virus or offensive materials, it is offensive to the readers. Therefore, the inability to control virus and offensive materials would lead to immediate or permanent suspension of advertising services. A document describing a kid suffering serious mental disorder from exposing to highly offensive display ads is a smoke gun by some reviewers while it may be dismissed by other reviewers. This example shows that differences in specific knowledge of reviewers can contribute to the conflicting coding decisions.

Many document requests require the reviewers to consider inherent and non-obvious properties in relevancy analysis. Those requests may be defined by words such as competitiveness, malice, unreasonableness, negligent, reckless, knowingly, greediness, unfair, inequitable, unjust . . . . Whenever any of such words is present in request definitions, the reviewers must determine what conduct, character, action, result, data, and evidence can prove or disapprove those properties. Coding documents for this kind of requests depend upon reviewers' knowledge and experience in the field.

Uncertain Relevant Component in a Mixture.

Sales data may include annual sales for the whole company, monthly sales for a division, daily sales by salesperson, sales data by categories, sales data in performance reports, and sales data in commission calculation reports. When relevant products comprise only a few of percentage of the total products and the contribution of relevant products cannot be separated from that of non-relevant products, a debate exists whether such sales data should be coded as responsive documents. Based upon the purpose of antitrust review, the drafter may be interested in documents containing the sales data of relevant products. When a request is literally read, it reads on all documents containing sales data. If the sales data in a document comprise the contribution of a small percent of non-relevant products, it would be hard to argue for not producing the document. In contrast, if the sales data comprise primarily the contribution of non-relevant products, there is no point to produce it. No one has provided a threshold number and the reviewers read this definition differently. The different judgments of reviewers have contributed to the coding inconsistencies.

Composition-dependent relevancy is universal. All kinds of measurement qualities such as weights, volumes, areas, revenue, and costs may represent a mixture of both relevant products and non-relevant products. In many high technology cases, even scientific measurement data such spectra, sound waves, mechanical properties etc. may be obtained for a mixture of both relevant products and non-relevant products. The amount of relevant products in the mixture may be anywhere from zero to near a unity. Moreover, the contributions to measurement quantities from relevant products and non-relevant products may be separated in some cases, but cannot in other cases. Thus, determining the relevancy for a document is not a simple question.

Clear Mistakes from Misunderstanding Facts.

If a product referenced by a model number is regarded as an infringing product while it is actually not, those documents concerning this product may be coded incorrectly. Producing any documents containing no relevant information is an error. Such an error might be harmless if produced documents cannot be used for any other purposes. Such an error may hurt the client if the non-responsive documents fall into the public domain or can be utilized by competitors. In reviewing documents for second request, producing documents that do not contain any relevant products or that are outside of the date range is also an error. Those types of errors happen due to insufficient review time, inadvertent omissions, or failure to understand key terms, jargon, acronyms, or implied assumptions.

Errors Attributable to Review Platforms.

There are many review platforms, and each of them has its owner user interface. Each review user interface has a unique page arrangement, color scheme, and interactive logic. When a reviewer has used to a particular user interface, the reviewer tends to do certain actions leading to errors on different review platforms. Some errors arise from using the coding pane. The coding pane may be designed in different looks and colors, relative positions and shapes, and with different user logic. Some review platforms do not require users to use review complete tag and allow the users to bypass a document by not toughing any tags. When a reviewer has used to a particular review platform for years, the reviewer will have a hard time to get used to a new review platform. While coding conventions are purely preference, coding tags "contrary" to its design intention can cause serious consequence. If backend fixes are impossible due to the unique tag structure, such errors must be fixed by a corrective review.

Another source of errors may be caused by different color schemes. In some review platforms, the coding pane uses different colors to represent different requests. When the color for "privilege withholding" is very similar to the color designated for production, it will increase the chance of mistakes. This can happen even though their colors differences are obvious on high quality screens, but they may look the same on a low quality display screens. Another error might be caused by different color schemes in highlighting text. The assignments of colors in one project affect the performance of some reviewers on a second project. For example, blue color has been used to denote privileged documents by convention. If a blue color is used to indicate responsive substance in documents, this color scheme may increase the risk of errors because those reviewers are used to well known color schemes and code documents as a habit. Moreover, when a coding color scheme is used, some reviewers, due to their vision defect, may be unable to distinguish all or particular two colors. Other things such as tag arrangements and design features may have contributed to coding errors as well.

One of the most common problems is how coding data are saved when a document has been reviewed. Some review platforms require the reviewers to save coding data affirmatively, some platforms save coding data automatically, while other platforms may give the reviewers an option to set auto-save function. On the platform that requires the reviewers to save coding data affirmatively, but the reviewer does not do so, all work will be lost. If a reviewer forgets to turn on the auto-save function, the reviewer may fail to save work. Some review platforms allow the reviewers to get into wrong ranges, and review documents, which have not been assigned to the reviewers. Occasionally, the problem is so pervasive that the whole team must conduct corrective review.

If a review platform does not save the document-list table for tracking assigned documents permanently, such review platform is not suitable for task sharing. On such a system, a document set is generated for the reviewers without saving it. For example, in a review system, all reviewers can review a fixed number of documents for a batch of 1000 documents, and the documents are shown by their non-reviewed status. Whenever a document has been reviewed, it disappears from the review folder's view. Ten reviewers are assigned to review all documents, and the manager divides all the documents into ten sections according to their relative bates numbers. All reviewers are able to find their ranges by the relative order numbers. After some reviewers have reviewed some documents and checked review complete tags, if any of the reviewers log out and log back, the system generates new review set based upon their new review statuses. The document set, as generated later, would become smaller and smaller as the review progresses. If their network is not interrupted and reviewers do not log out their accounts, the system will not cause any problem. However, if the network is interrupted or some of reviewers log out of their accounts, they cannot get back their ranges. If a reviewer logs in and retrieves the document set at the time when 300 documents had been reviewed, the reviewer will see only 700 documents. The relative order of those documents is not the same as the original 1000 documents. If the network for the entire site is interrupted briefly, the original assignment ranges will be totally messed up. The manager has to stop the whole team and reassign new review ranges for all of them.

For a small case, the ability to navigate from folder to folder is desirable. Such feature, when used in a large production project, can become a huge problem. In some review platforms, the reviewers can open documents assigned to him. The reviewer may be able to open other associated documents such as duplicate documents and attachments. Those documents may be in different folder or ranges. When the reviewer opens such a document, the reviewer actually enters a different folder and range. The reviewer can always get out of the ranges of other reviewers and came back to his assigned range. However, if the reviewer has entered into a different document range and forgets to get back to the designated range, the reviewer starts reviewing documents in the range that is not assigned to the reviewer. Some reviewers may have done days of work in unintended document ranges. This review range errors may be found many days later.

A review platform may be configured with certain feature. Under some setting, if a document is not coded, the document is considered as non-responsive by default. The reviewers need to code only those responsive documents. However, it a reviewer skipped a document inadvertently, it would be marked as non-responsive document. Therefore, it is impossible to decide which document is non-responsive and which document is due to an error. The only solution to this problem is to review the entire document pool.

Errors Caused by Memory Limitation.

A complex document review requires the reviewers to know an overwhelming amount of case information. Each of the reviewers may get a two-inch-thick binder containing case background, document request, product descriptions, past transactions, attorney names list, employee list, complaint, media reports, and executive lists etc. The total tabs can be anywhere from five to fifty. The attorney names list may include in-house counsel names, and outside counsel firms, and, for each firm, it has tens to hundreds of attorney names. After one day of training, and one day of reading case files, the reviewers can absorb only a limited amount of information. The performance of the reviewers entirely depends upon nature of task, reviewing methodology, information organization, relevant experience, and their learning capacity. While the learning curve for all reviewers are different, they are slow in general. If the task is to find any of the thousands of attorney names from each of documents, the reviewers have to remember all names or have to cross check each encountered name against the names in the attorney names list. No reviewer can remember so many names. A diligent work would require the reviewers to cross check all encountered names against the names on the list. In addition, many names are spelled informally or with informal initials, making it more difficult to recognize. For all those reasons, the task is extremely time-consuming. If the reviewers are required to perform the task at a high speed, they can make a large number of errors. The law firm can only get an excellent accuracy at prohibited costs or get extremely bad work product from imposing a review quota. The slow memorization and memory capacity limitation are the limiting factor for many types of litigation tasks.

Errors and Inconsistencies Caused by Changes.

Litigation is an adversarial process, the course of which is often unpredictable, and all aspects of the review plan changes in response to the various events such as addition of new parties, abandonment of case, agreement on discovery issues, removal of issues, settlements of claims, dismissal of case, filing of appeal, insolvency of a party, and ruling on discovery motions. Unfortunately, current discovery model is extended from the conventional model with poor ability to address unpredictable but frequent changes. Each change may lead to two consequences. First, the prior coding will be inconsistent with future coding. If the change takes place in the middle of review, the coding done in the first half of the project may be opposite to the coding done in the second half of the project. If the law firm has time and if cost permits, the law firm may fix all prior coding problems. This is not always feasible under various circumstances. Those "inconsistencies" and "errors" are not coding quality problems.

The database structure, review process, and coding system are designed without enough flexibility. It is expensive to make any changes to the review plan such as addition of custodians, addition of new documents from certain custodians, and change in scope of review. Certain changes such as modification of tags, addition of a tag, removal of a tag, merger of two tags, splitting of a tag, and deletion of a tag may also require corrective reviews.

Errors Due to Lack of Uniform Standards.

The document review industry lacks standard models and standard instruction languages. All common terms such as responsiveness, relevancy, hot, very hot, privilege, material, and clearly erroneous mean different things to different reviewers. They may mean different things on different sites. Many procedural terms such as review complete, technical problem, language issues, non-translated text, and illegible text also mean different things at different review sites. Every reviewer understands "technical problem." In reality, reviewers are unable to tell differences between real technical problems, troublesome documents, or poorly converted documents. Different interpretations of request definitions are one of the major reasons for conducting corrective reviews and re-work.

Errors Caused by Poor Communication.

A review site may provide very brief outlines to reviewers. Experienced reviewers may use what they have learned from other production projects. Even if a comprehensive review outline is provided, it still cannot eliminate all interpretation gaps. Experienced reviewers know general approaches and thus have to "port" substantive standards and conventions they learned from other review sites to the current project. Some of the standards and conventions may be inconsistent with what is intended to achieve at the current site. The outline may fail to mention how tags are related to each other, and how to use each of the tags. Thus, the reviewers may have to port a coding convention that would be conflicting with the intended convention into the current review site.

Another source of communication problems is that written instructions are amended by oral instructions, and oral instructions given by a plurality of site managers are inconsistent on their face or susceptible to different interpretations. More serious problems arise when newly added reviewers do not receive the amended oral instructions, but receive the same obsolete review instructions. If the new reviewers do not get all oral amendments, they would continue to use the obsolete written definitions in the review instructions. Even if the reviewers heard all oral amendments, some of the new reviewers may not get all points. On review sites, oral instructions are not well archived. A serious problem arises after a project is on hold for a long period of time and then continues by a different review team. The new review team may use the obsolete review instructions. If the manager is also changed, the review team will repeat the whole process of tackling riddles, identifying significant issues, and refining coding rules.

Errors and Inconsistencies from Unknown Factors.

It is observed that when a large number of people are taught to learn many rules and asked to apply the rules to complex facts, it is unavoidable that a considerable number of rules will be misapplied no matter how well they understand the rules. The misapplications will happen even if all of them can recite the rules. When they apply a rule, they either construe the rule in different scopes or take identical facts in different ways. When the number of people is large, a certain percent of people even misunderstand some of the rules. Total elimination of coding inconsistency cannot be achieved by training alone. This observation is parallel to the general learning process. All students, who have just learned a physical law in a class, are unable to solve all problems correctly. Their problem-solving skills can be developed only by exercises. Memorization of review instructions is not enough for correctly coding documents.

B. Review Performance Evaluation Methods

The Measure of Overall Review Quality.

The quality of a document review is ultimately judged from its performance in achieving client's final goal. If the work product of a review gives the client the best chance to win its case, the review quality is excellent. If the work product gives the client a fair chance to win or defend its case, the review quality is fair. If the work product ruins the client's chance to win or defend its case, it is bad, notwithstanding good consistencies and low error rates. The useful review quality measure must be adjusted against the changes due to litigation need. The final performance measure must include how well the work product addresses critical issues and protect client's business secrets, control unnecessary scandals, and limit the chance to provide useful information to future adversary. Error rate and coding inconsistency are just one measure that cannot be correlated to final performance.

Figure 2:
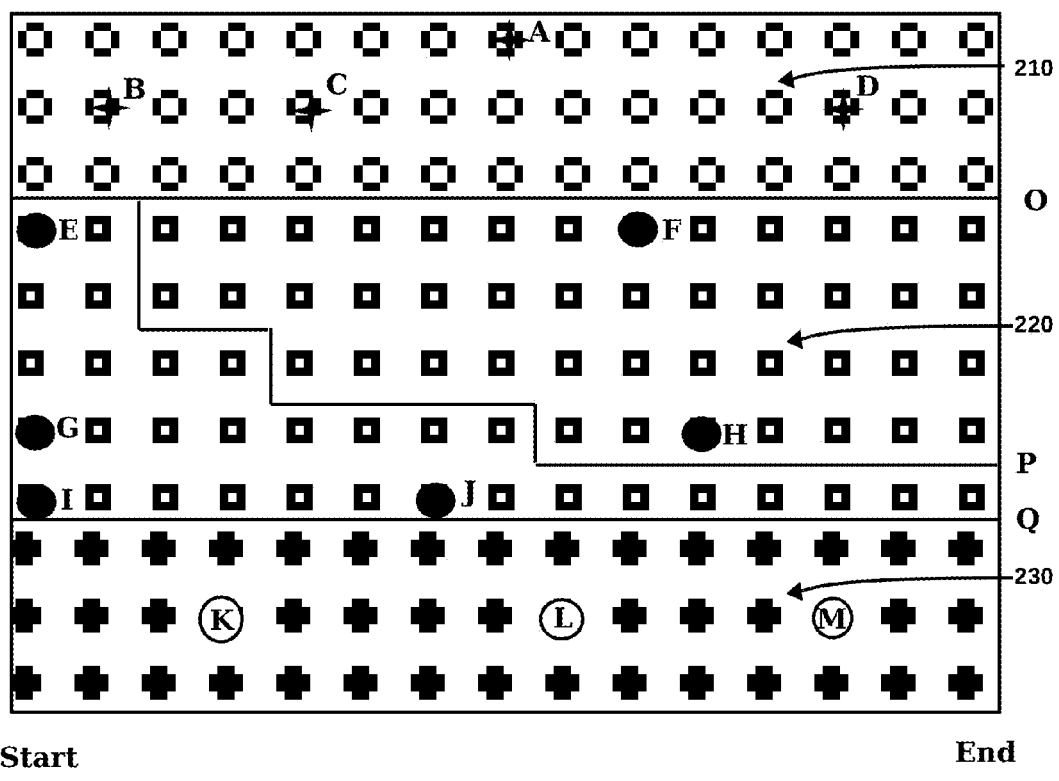
FIG. 2 shows three areas respectively for non-responsive documents, arguably responsive documents, and responsive documents.

FIG. 2 shows how documents fall within three areas for non-responsive documents 210, arguably responsive documents 220, and responsive documents 230. Responsiveness means that the document is included in this request. This figure shows the entire area is divided by lines O and Q. All documents above line O are non-responsive. They cannot be read on by the request in any conceivable way. The documents below line Q are clearly responsive to the request. The definition reads on them. This area 230 does not include all documents that are reached by a mere literal reading. All documents in area 220 between lines O and P are arguably responsive. This area includes all documents that the request reads on literally, but they are meaningless. Line O is a hypothetical upper bound defined by the request and Line Q is a hypothetical lower bound defined by the request. Those bounds are imaginary because neither the drafter nor the reviewers know their precise positions. Line P represents a real coding bound which has been used in the review. This bound is formed as a result of necessities, negotiation, litigation, and risk-taking decisions.

Type I Error.

Type I error occurs when a responsive document is coded as non-responsive document. For the privilege tag, this is an error that a privilege document is coded as non-privileged document. This is a serious error. Documents K, L, and M in area 230 are actually responsive, but are coded as non-responsive documents.

Type II Error.

A type II error occurs when non-responsive document is coded as responsive document. Documents A, B, C and D in the area 210 are non-responsive documents but are coded as responsive. For the privilege tag, this error is made when a non-privilege document is coded as privileged document. This is a less serious error generally, but may increase a risk of leaking business secrets.

Apparent Coding Inconsistencies.

Coding inconsistency is a measure of the coding differences for same or similar documents. Documents E and document F in the area 220 contain the same or similar substance, but they are coded consistently. So are document I and document J, which are coded consistently. However, document G is coded as responsive under the initial rule, but document H, which contains the same substance, is coded as non-responsive, as a result of change in the request. Under the initial hypothetical bound, all documents within the area 220 formed by lines O and Q could be responsive. However, due to three changes to the requests or coding rules, as indicted by three vertical lines in the line P, all documents in the area formed by the lines O and P are considered as non-responsive. The tag values coded in the early stage may be directly conflicting with tag values coded in a later stage. To eliminate this type of coding conflicts, the solution is to conduct a corrective review for the prior-coded documents according to the final coding rules. If the client's resources do not allow for reconciling review, the work products will have great inconsistencies. Considering the sources of coding errors and inconsistency, any measures based upon pure statistical quantities such as sum of squares, variances, and deviation from a hypothetical definition are meaningless. The inconsistency should be adjusted against the actual boundary P. Only an inconsistency between two documents under the same coding rule is counted a real inconsistency. Document I and document J are within the arguably responsive area, and, if they are coded differently, they are considered a real inconsistency. Document G is coded as responsive while document H is coded as non-responsive. The coding difference between G and H are the result of different coding rules. Document E and its close right neighbor document contain similar substance. If document E and neighbor are coded differently, the difference would be a real inconsistency.

Adjusted Coding Inconsistencies.

To evaluate true inconsistencies, one possible method is to determine sum of squares or variances based upon properly designated score for each conflicting coding for each time period while the coding rules are not changed, and then compute a properly-weighed quantity for all documents for all tags. In this way, the inconsistency measure is adjusted against the changes in coding rules and requests. When this adjustment is made, the coding performance of review is not as bad as they appear.

A computer algorithm can beat human performance for peculiar reasons. Due to how computer algorithm works, computer algorithms make both type I and type II errors. The computer determines responsiveness and privilege by existence of certain key words and the pattern of certain words and phrases. Computers may able to code similar documents according to coded similar documents. The result of computer-coded documents would entirely depend upon the selection of key words.

Since the accuracy of the computer algorithm does not depend upon its execution speed, it can always win in high speed. In coding documents at the speed of one document per hour per, a reviewer can easily beat the computer in accuracy. If the reviewer increases his speed, the error rate will increase. At some point, the error rate will be equal to computer's error rate. If the reviewer further increases coding speed, the error rate will exceed computer's error rate. When a human reviewer increases coding speed to a certain point, the reviewer has no time to read and conduct analysis, the reviewer has to code documents by guess ("guess point"). By total guess, the reviewer might code 50% of documents as responsive and other 50% as non-responsive. Of course, the reviewer can guess by using whatever ratio the reviewer might feel proper. If the document pool has only 10% responsive documents, and the reviewer flips a coin to code them, half of them are coded as responsive and other half as non-responsive. In terms of the total frequency, in the responsive documents, the reviewers will code 5% correctly and other 5% wrongly. In the non-responsive documents (90%), the reviewer codes 45% as responsive and 45% of non-responsive. The error rate for the entire pool is 50%. In the documents coded as responsive, only 10% documents are coded correctly, and the remaining 90% are coded incorrectly. In the documents coded as non-responsive, 90% them are coded correctly but 10% are coded incorrect. When review speed is increased, the impact is primarily on the documents that have been coded as responsive.

If the documents pool has 50% responsive documents and 50% of non-responsive documents, and the reviewer codes them by flipping-coin guess, in the documents coded as responsive, the error rate is 50%. In the documents coded as non-responsive, the error rate would also be 50%. The high non-responsive ratio in the original document pool can exaggerate the error rate when the reviewer is forced to code documents at high speed. One can easily see that if a document pool has only 1% responsive documents, coding by guess will create an extremely high error rate in the responsive documents.

The ability to properly address critical issues must be considered in real performance analysis. In a typical case, each side proves a limited number of elements and disproves the opposing side's elements. In a typical motion hearing, a party may use a few pages to several hundreds pages of exhibits. Win or loss often depends upon if the party can find sufficient documents in support of their argument. Each side has its week points in its claims or defenses. Thus, the identifications and handling of this small set of documents, particularly the weakest points, would be more important than how the rest of a million documents are coded. The following examples show how case disposition depends upon a small number of documents. A party may lose its case because the party is unable to find one or two solid documents in support of a critical issue or fact.

When the government has serious anti-competitive concern for a merger, the evidence to show the existence of intensive competition may help the client win the approval. Identification of documents showing existence of mighty competitors, large number of competing products, numerous substitute products, technology to replace the current relevant products is more important than coding consistency for the rest of documents.

In any case where punitive damages are allowed and demanded, the ability to win punitive damages depends upon if the party can show that the opposing party acts in malice. Malice may be found by looking at one single document or a combination of two or more documents. Malice might be implied from statements or conducts described in documents. Due to potential award amount, the ability to identify and handle of those documents are far more important than coding consistency.

In a patent infringement case, the plaintiff must show that the defendant's products infringe a valid United State patent, whereas the defendant may show that the patent in suit is invalid because it was obvious in light of prior art, and plaintiff committed inequitable conduct during patent prosecution and misused the patent after getting the patent. The plaintiff must find documents showing the infringement products, while the defendant must identify all prior art references for invalidating the patent.

In an internal review for bribery and corporate looting, the objective is to find all facts revolving bribery. All players know that bribery and looting is crime, and they would not directly describe their acts in documents. However, they leave some trace such as potential contacts and middlemen, locations, involved business transactions, and potential money sources. To review documents by normal rule with a quota will make the review a total waste of resources.

The use of computer algorithms to find relevant documents should be carefully scrutinized. If a unique key is not used, all documents that contain only this relevant key will be coded as non-responsive and thus making type I error. Computer algorithms may code non-responsive documents as responsive, thereby making type II errors. If a key combination such as "provide . . . legal advice" is used, all email messages containing a privilege warning will be coded as privileged. Also, certain word part such as "law" would get all documents sent by "lawson." There are all kinds situations where the search keys can give a great excessive false positive result. Computer algorithms at the current state of art, as known in the published media, cannot effectively address the following situations:

Current algorithms are unable to understand background technologies and technical terms. Most of the corporate business involves complex technologies. There are always situations where a coding decision requires the reviewer to understand underlying technologies of the business. In those cases, a search key will not be enough. In patent infringement case, an infringing product and non-infringing product may share hundred of common features. They may be different in one or two features, which are not spelled out in documents. It is impossible to use proper keys to make a determination.

Current algorithms lack ability to associate various parts of context to form particular meaning. The value of human review is of course is their ability to associate different parts of materials in a document and are able to read implied assumptions in the documents. At this stage, the computer's ability to associate different parts of materials in a document is still poor. Even human reviewers show different skill levels in figuring out subtle facts. Even though documents are reviewed on the substance on their faces, the interpretation of the terms such as attorney roles, product nature, product requests and so on depends upon the reviewers' knowledge.

Current algorithms are unable to understand the assumptions known to both writer and readers. Most corporate documents do not reveal known assumptions and background stories. They are written with context known to both sides. Even human reviewers cannot figure out assumptions. Humans are in a better position to understand assumptions and can gradually pick up the assumptions by reviewing documents in contexts. Unless a computer algorithm has the same human intelligence and same language ability, it cannot pick up all context knowledge. Moreover, most corporate documents only describe one thing a time. For example, after company failed to win a bid over a sale of a relevant product, the Vice President in charge might send email describing some strategic changes. This email does not mention anything about relevant products, models, and bidding process . . . . It is an effort to reduce costs in the material or process for making the relevant product. All key employees who know the lost bid would know the purpose of the email. However, a brief review of some sample documents may not get all search keys for getting this class of documents.

Current algorithms may be unable to understand informal expressions, improper abbreviations, obvious errors, and obvious omissions, and thus cannot make intelligent coding decisions. Many documents contain only one to a few sentences. If the only key is expressed in an informal way, or with a mistake, this document may be excluded from further review. To avoid type I error from this aspect, the key matrix must include all informal words, potential abbreviations, and misspelled forms. A search including those variants may result in over-inclusive type II errors.

Current computer algorithms may be unable to understand any of inherent properties, emotions, and good and bad intents. When a computer algorithm runs across a document that describes an incidence that sales stands were destroyed, it does not mention who does, who own the display stands, and what the display stands are for. The document is circulated among company leaders who all knew background facts. It does not contain any key words for relevant products and keys normally associated with competition. Unless all documents for a sender and a recipient are coded as relevant, there is no basis to code them as responsive. A reviewer who does not know the background facts may be unable to see any meaning. When a reviewer figures out that some employees destroyed a competitor's display stands to gain a competitive advantage, this document is a smoke gun. If a computer can be trained to code this document, it would require an input of the story. A computer algorithm will not be able to recognize a document, which subtly "admits" that the company is sell poisons to the public. The failure to identify such sensitive documents could substantially increase punitive liability. Even experienced investigators may be unable to identify such documents and the ability to identify such documents may require considerable training in relevant field.

Current computer algorithms lack ability to make connection between two or more things by times, persons, or events. To protect confidential secrets, a sender sends a zip file to a recipient in email. In another email, the same sender sends another email containing a string from a different email address to the same recipient. By coding the second email as non-responsive, the zip file can never be opened. A computer algorithm specifically designed for such an event may be unable to capture the documents correctly. In a case of investigating bribery, excluding any documents by using relevancy keys would make the whole review meaningless. Since bribery players know that bribery is illegal, any documents concerning bribery, if any, are written in innocent text, without disclosing discussion context, true contact names, involved property, and time and place. It may be as innocent as "It was great to meet with you. Meet with you again." The email was from a public email address and the user name is a funny notation. In this case, even a highly experienced investigator may dismiss it. There is no possibility for a computer to recognize documents. It is highly unlikely to see a statement that clearly reveals criminal conduct. Critical documents may be outsides the hits of a search using search keys that are formulated based upon a brief review of sample documents. Some clients may provide a list of relevant keys, but they may be insufficient to reach critical documents.

Computer algorithm's ability to find relevant documents depends upon the selection of key matrix in light of the nature of documents and the specific search features. The ability to find all responsive documents depends upon the search key matrix and algorithm designs. If the keys are formulated from a brief review of sample documents and interviews with the client's employees, it has real chance to leave out important documents.

Computer algorithms in the present stage cannot beat humans in a large number of categories of discovery tasks. The above are only a few examples. There are many more situations that require human intelligence for recognizing responsive documents. Coding inconsistencies determined for the documents coded by computer algorithms cannot include the inconsistencies caused by the changes to the requests and coding rules. In other words, the consistency sources for computer-coded documents are different from those for the documents reviewed by human reviewers. When a computer is used to code a set of documents, it can code documents quickly. Thus, all inconsistencies are true consistencies that the algorithm creates. As demonstrated above, the biggest sources of inconsistencies are caused by improper document requests and changes to the requests and coding rules. It can be reasonably expected that aggressive law firms may produce documents with higher coding inconsistencies, while the law firms, which do not bother to change the scopes of requests, may create documents with better consistency. For this reason, an absolute inconsistency measured by any statistical quality such as sums of squares and variances is not a proper measure. The inconsistency degrees and error rates should be adjusted against the changes to coding rules and requests. Even adjusted inconsistency cannot be correlated to final performance, as pointed out above.

Computer algorithms have played a role to decrease review quality for several reasons. First, the high coding speed at the "similar inconsistency" has driven some law firms and clients to seek high review speeds. When the reviewers are to race with computers, the performance of review become worse. The quota such as 100-200 documents per hour has further increased errors rate and inconsistency degree. Given apparent success, computer algorithms become more popular. They are used to reduce the size of review pool, prioritize documents, bulk-code documents, and code duplicate documents by file similarity. When those methods are improperly used, they may create document pools that are difficult to review. Language context and business activity context may be disrupted, critical fact-descriptive documents may be eliminated or placed in the batches of the least relevancy, critical documents may be removed as non-responsive, and image files may be processed as illegible documents. As a result, coding decisions cannot be based upon real substances, but based upon the reviewers' ability to understand. The industry develops an unwritten rule that a document should be coded as non-responsive if the reviewer cannot see any reason to be responsive. The competition between computer algorithms and human reviewers can further degrade discovery quality. To meet quota, the reviewers can just spend a few seconds to read a document. The review at higher speeds results in more errors and more inconsistencies. When performance of human review is worse than that of computer algorithms as a result of using improper consistency measures. There is more incentive to use computer algorithms. The computer operations may interfere with human review and will result in even worse product. More computer methods are used to reduce review costs and improve accuracy. For the cases where document review is only a formality, this model can save costs. However, this race-for-bottom review model may be not a perfect choice for highly contentious cases involving massive civil liability, punitive liability, and criminal liability. True coding accuracy depends upon human reviewers until computer algorithms reach human intelligence.

C. Critical Fact-Descriptive Documents and their Distributions

The method of the present invention is based upon a fundamental premise that the substance in any corporate documents is unknown to both drafters and reviewers in advance. No one can tell what is in the documents of any company. One cannot tell anything as to specific file types, document sizes, distribution patterns, and substances. This premise leads two inferences. Document request of a proper scope cannot be propounded because the drafters do not know what their requests intend to reach. During the review process, the reviewers do not know exactly what the requests are intended to read on. This premise determines that the scope of the requests and their application to facts cannot be determined in advance. They must be refined, improved, and perfected during the review process. The large size of document pool and large number of coding tags further complicate this trial-and-error process. For the same reason, a relevance search algorithm cannot be specifically designed for a particular case because the developers cannot know what they want.

Among all documents, there are two kinds of documents: documents that contain insufficient information for coding, and documents containing elementary facts, which may help reviewers make coding decisions for other documents. For example, email sent from a client to a person concerning a legal issue, the existence of attorney-client between the sender and the recipient determines how the document is coded for privilege. This fact may be fully disclosed in one single document or revealed in several documents. This document is referred as critical fact-descriptive document ("CFD") and the elementary fact described in the document can help the reviewer make a coding decisions' for the tag for other documents that are related to the elementary fact. For example, a retainer agreement or billing statement of an attorney may establish the attorney's role in a transaction involving many parities; a document may describe a product revealing its infringing nature; dividend distribution statement can establish the key shareholders; and a document discussing product type may imply if a product is a relevant product. Unfortunately, the critical fact-describing document cannot be found in advance and its appearance in any review order might follow a random or similar distribution. More often than not, those documents themselves are non-responsive, and could be excluded by relevant search keys. In some cases, an elementary fact can be established by reading several documents. In other cases, a reviewer can gradually figure out an elementary fact from reading several documents. In a multiparty negotiation transaction, many attorneys may discuss over a transaction. They may send, receive, and forward documents, review draft agreements, and make comments on drafts. Most of the times, they do not mention or imply whom they represent for. Occasionally, a lawyer may make a comment about its client's employees, client's business, client property, or client's preference in a way of indicating his affiliation with the client.

When a reviewer does not know a must-know elementary fact, the only thing the reviewer can do is to find the details by a careful reading of the document. This effort may be unworkable, and the reviewer still makes a coding error by best guess. A wrong determination of an elementary fact such as an attorney's role, transaction nature, document identity, employee affiliation, property ownership, publication source, and virtually anything (e.g., file distribution histories, unique document drafting practices) may decisively affect coding decisions under specific circumstances. A single tag may depend two or more elementary facts. For a document sent to an attorney and another recipient, the privilege tag will depend upon the attorney's role and the identity of the second recipient. The email is privileged only if the attorney represents the client and the second recipient is the client's employee but not a third party.

Figure 3:
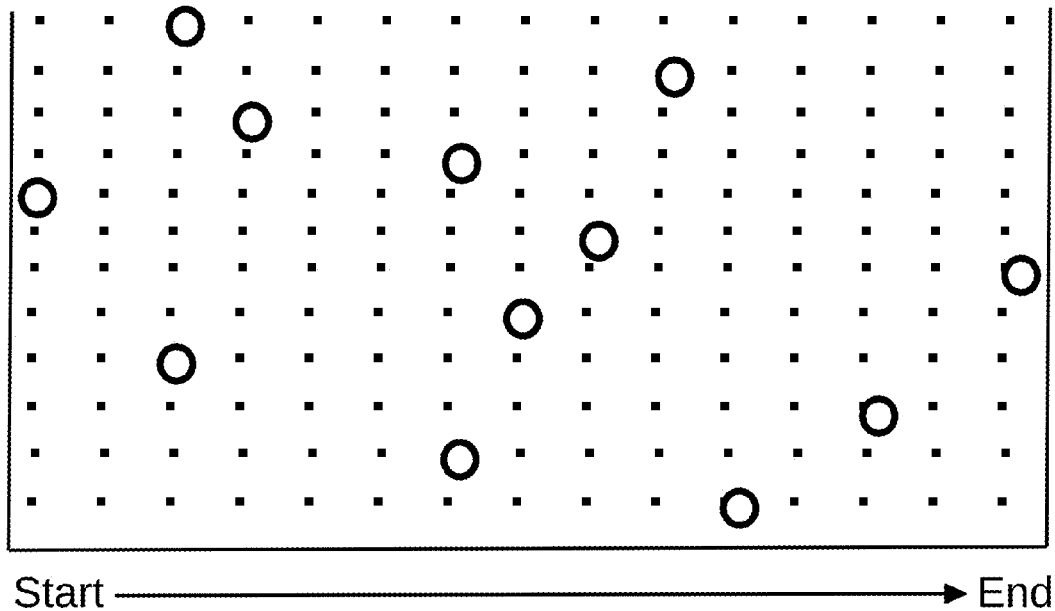
FIG. 3 shows a hypothetical distribution pattern of one critical fact-descriptive document in a series of 15 affected documents.

FIG. 3 shows the distribution of one critical fact-descriptive document in M affected documents. In this figure, it is assumed that only one document discusses an elementary fact that affects the coding of N documents, and this document is not linked to other things such as search key, creation time, control number, and assignment methods, this document may appear first, middle, the last, or anywhere in same frequency in the review sequence. It's appearance position in a relative order follows a uniform distribution with its median frequency in the center (50%). Documents comprise many series of such documents. Fr each of the series of documents, there are one or more critical fact-descriptive documents and there are M affected documents. If there are a large number of series of documents, the reviewer may encounter the critical document in the middle on average.

Figure 4:
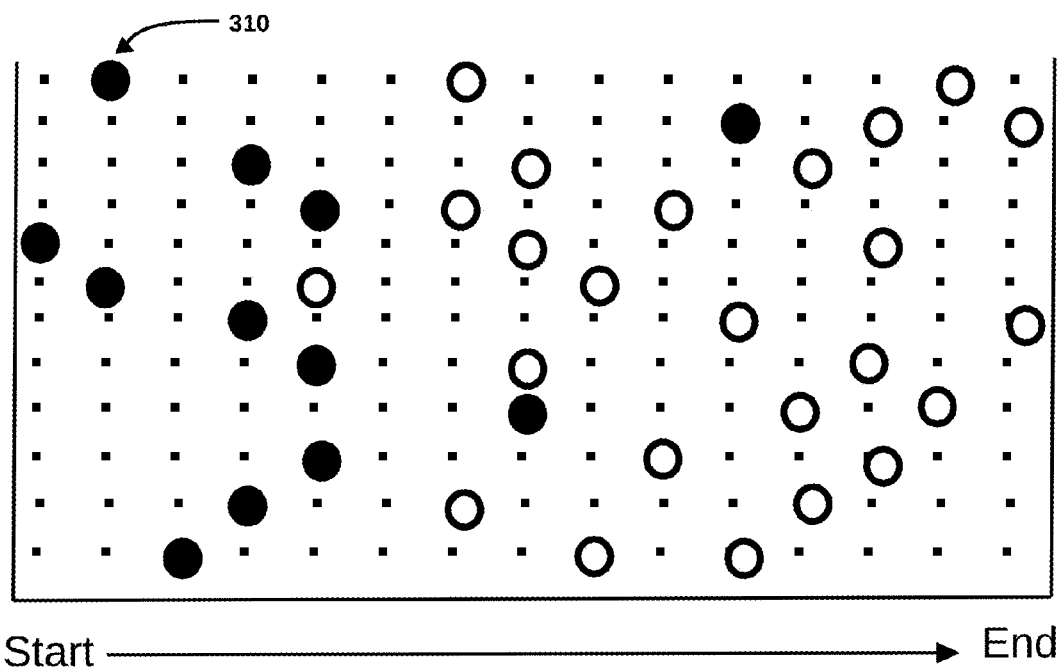
FIG. 4 shows the distribution of the first critical fact-descriptive document in a series of 15 affected documents including three critical fact-descriptive documents.

FIG. 4 shows the distribution of N fact-descriptive documents in M affected documents (where N=3). The M documents are randomly distributed in a document sequence. If only one person reviews the documents, the reviewer can correctly code affected documents after the reviewer has read the first critical fact-descriptive document. By generating a large number of document sequences and observing the positions of the first critical fact-descriptive document (marked in a solid black) in each of the document review sequences, one can see the distribution of the first critical fact-descriptive documents. Even though all critical fact-descriptive documents are distributed in each sequence, the first critical fact-descriptive document (marked in solid black color) will have serious bias toward an early position. Depending upon the values of N and M, its average position may be between the first position and the middle position. This distribution pattern can be observed in practice, proved mathematically, and confirmed by random drawing experiment. Accurate proof is not necessary for this invention because the trend must be correct. A document pool may contain a large number of series of documents. Each series of documents consist of N critical fact-descriptive documents and M affected documents. If one generates a distribution for each series of documents and calculates the average position of the first fact-descriptive document, one would get pattern shown in FIG. 5.

Figure 5:
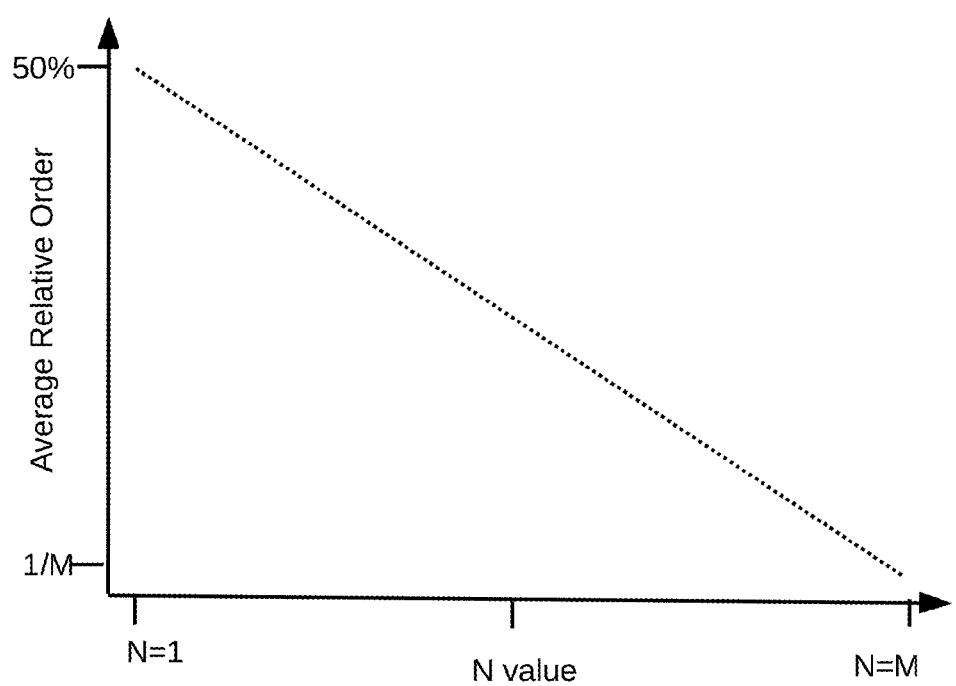
FIG. 5 shows the average appearance position in a relative order of N critical fact-descriptive documents in M affected documents.

FIG. 5 shows the average first critical fact-descriptive document for N critical fact-descriptive documents in M related documents. This curve can be found by taking its limits. When N is zero, the reviewer will never get such a document. When N=1, it has a uniform distribution, and thus the average relative position of the critical fact-descriptive document is in the middle (50%). By approaching N to M, all documents are critical fact-descriptive documents, the average position of the first fact-descriptive is 1. The appearance position of the first fact-descriptive document is mostly likely in the range from 1/M to 50%. From the trend from taking the two limits, one can predict that, the higher frequency of critical fact-descriptive documents, the earlier relative position of the first critical fact-descriptive document. The exact average position of the first critical fact-descriptive document depends upon the values of M and N. The shapes of actual line or cures shape in FIG. 5 may depend upon M value.

In this disclosure, the focus is on the relative order or document sequence of a set of documents comprising one or more critical fact-descriptive documents and M affected documents. Many other documents may be anywhere in the server delivery order, but are ignored as if they did not exist. A sequence of documents may be in the one reviewer's review queue, and may be assigned to several reviewers. For example, a document sequence, as viewed from the server delivery time, may comprise two affected documents in a first reviewer's queue, twenty affected documents in a second reviewer's queue, one critical fact-descriptive document in a third reviewer's queue, and fifty affected documents in a fourth reviewer's queue. One can construct a relative order or document sequence for the 83 documents by their actual delivery time ignoring all intervening documents. The intervening documents are assumed to be randomly distributed among all those interested documents without disrupting their relevant positions.

The earliest capture of the critical fact-descriptive documents will affect review accuracy and review costs. On a review project where only one single reviewer reviews all documents, the reviewer will review all documents. For a unique tag, the reviewer has to make the best guess before the reviewer reads the first critical fact-descriptive document concerning the substance affecting the tag. After the reviewer reads the first fact-descriptive document, the reviewer can code remaining documents correctly. The overall error rate for this series of documents depends upon when this first document appears. If the reviewer encounters the first fact-descriptive document in 10% percentile, the reviewer will code 9% of the documents by best guess, and code the remaining 90% documents correctly. If the reviewer runs across the fact-descriptive document at the 40% percentile, the reviewer codes the 39% of documents by best guess, but will code the rest 60% of documents on this issue correctly. If this document appears in the last position, the reviewer may code all documents except the last one by best guess. As shown, the first critical fact-descriptive document appears at a relatively early position, the reviewer may have to make guess for a small portion of documents. However, if the whole series of documents are broken into many sections and assign the sections to a group of reviewers, some reviewers will be in a much worse position to review their documents.

D. Strategies for Improving Review Performance

The above analysis shows that there is an error propagation mechanism: if the reviewer does not know a critical elementary fact, the reviewer will make error for one, two, and many documents containing substance related to this fact. Strangely enough, this error propagation mechanism is greatly enhanced by a term work arrangement under the current review model. The fact that a reviewer makes similar errors in all related documents can be easily proved in practice.

Each of the review document pool has a large number of elementary facts. An elementary fact could be anything that affects coding decisions. If an elementary fact is unclear, the reviewer can make different decisions in different contexts. The documents, the coding of which depend upon an elementary fact, may be coded in either ways, unless the elementary fact is known. Those documents are referred to as "affected documents." If the elementary fact is not resolved, the same coding error will appear for all those affected documents. Elementary facts include attorney identity, law firm's role, consultant's role, partners role, person's identity, product nature, identity of relevant product, model numbers, serial codes, product common names, product inherent properties, product features, unidentified shipments, measurement data, transaction names, code names, patent numbers, prior art references, publications and articles, acronyms and terms, informational phrases, undisclosed financial reports, business plans, poorly identified contracts, legal instruments, legal matters, cause of actions, and case numbers. Any of the above things may appear in any documents, and becomes a critical elementary fact affecting coding decisions for some documents under specific circumstances. They become critical elementary facts because all affected documents do not provide the details on this elementary fact that is critical to the coding of those documents.

If a reviewer understands a critical elementary fact incorrectly, the reviewer may code a large number of affected documents incorrectly. The same error will propagate among all similar documents. If UX-1654 is coded as infringing product while it is actually not, hundreds or even thousands of documents containing this model number may be coded incorrectly. The high appearance frequency of elementary facts and a large number of affected documents are due to the following reasons:

(1) Documents are distributed to many employees and many business groups, and are saved on servers, personal computers, and notebooks, and all kinds of media.

(2) Substantially duplicate documents cannot be removed and cannot be bulk-coded. In email chains, a large number of email messages of various lengths may discuss the same substance.

(3) Duplicate documents cannot be removed when the knowledge of certain corporate executives is an issue or the documents are not exactly identical.

(4) Each of business transactions takes some time to finish. Therefore, many facts, transactions, person names, relevant terms, and acronyms appear in large numbers of documents concerning different parts of the transaction. The documents do not contain certain details that are critical to at least one coding decision.

(5) Many complex legal issues appear, are discussed, or mentioned in different documents. For example, a merger integration implementation may be discussed in a large number of documents.

Therefore, the first strategy is to break up the error-propagation mechanism in the team-working environment.

The second strategy is to construct language context disrupted by team-working arrangement. The distribution of a series of documents among several reviewers makes the situation worse. If the document pool contains only one fact-descriptive document for a series of affected documents, only one reviewer will encounter it. After reading it, the reviewer can correctly review the rest of the documents, but the rest of reviewers will not see this document. They have to code their documents by best guess. In this case, the lucky reviewer can code some of the documents correctly. But the rest of the reviewers will code 50% of them incorrectly and 50% them correctly if they code them by flipping a coin.

When a series of documents containing N critical fact-descriptive documents are assigned to several reviewer ranges, some reviewers get one at a certain relative position, some reviewers may get two or more at different relative positions, and other reviewers may get none of them. Those reviewers who get at least one will improve their ability to code after reading it, but those who do not get any will make the best guess throughout their ranges. Even though, the first fact-descriptive document may appear in the first position in server's delivery time, the break-up of this series of documents among many reviewers make the review more difficulty. Since the whole series of documents is assigned to several reviewers, each reviewer reads documents out of language context and business activity context. The reviewers cannot understand terms, person identities, model numbers, informal expressions, and background. Faced with a large number of unknown, the reviewers can only make the best guess in a few seconds allowed time.

For any corporate transactions, a typical document reveals only a fraction of a series of actions. For a contract dispute, documents may cover initial lead, initial contact, preparation of bidding documents, tendering bids, formation of contract, post-bidding activities, delivery of products, making payment, natural disaster, material cost increase, breach of contract, termination of contract, filing lawsuit, retention of law firms, settlement discussion, drafting settlement agreement, and signing settlement agreement. When the reviewers know all events, they can code documents correctly. If thousands of documents are drawn from their sources, and arbitrarily assigned to fifty reviewers according to search keys, the assignment totally disrupts language context and business activity context. One reviewer may get a first document about arranging for signing a settlement agreement. One reviewer may see documents concerning a natural disaster. One reviewer may see documents about five lawyers discussing a contract dispute. Most of the corporate documents, especially email, contain only one to a few sentences. From the four corners of documents, many documents are incompetent for review. The reviewers can read all words such as "the bid," "the product XYZ," "the agreement," "the disaster," "material cost," "the suit," . . . but cannot understand what they exactly mean in relation to the document requests. Some reviewers did not see related documents, some do not know any of the players in documents, some do not have any background knowledge, and some do not understand jargon, informal terms, and misspelled words. The portion of incomprehensible substances in corporate documents can be anywhere from less then 1% to more than 95% in terms of word counts. Sometimes, misunderstanding one critical word may lead to a coding error, but in other cases, one may be able to code a document correctly even though it contains a very high portion of incomprehensible text. In general, reviewers make their coding decisions by best guess.

E. Method for Improving Document Review Performance

Given the number of sources contributing to coding inconsistencies and errors, one must fundamentally evaluate the existing review model and its problems.

The method is that in such a team work environment, whenever a reviewer encounters a critical fact-descriptive document, the fact is collected and shared with all other reviewers so that the entire team will benefit. By this arrangement, all reviewers will be able to make sound decision as soon as any of the reviewers encounters the first critical fact-descriptive document. If the reviewer finds the document at position P=20% for M=1000 affected documents, all reviewers can correctly code the rest 80% of documents. Assuming that the elementary fact affects one tag, the sharing arrangement will help the reviewers code the rest 800 documents correctly. The time for the reviewers to struggle will be reduced, and the overall one-path review accuracy and consistency will be dramatically improved. Thus, the number of documents required of fixes will be reduced. By sharing elementary facts, the reviewers who never get any critical fact-descriptive documents will benefit the most. Depending upon when the reviewer first encounters the documents discussing the elementary fact, the reviewer may be able to code some documents correctly. Many reviewers may be in position to "see" the elementary fact even before they start reviewing affected documents. However, this sharing arrangement does not affect the coding of the first 200 documents in the case. That part of documents might contain many improperly coded tags.

If the overall appearance position of all fact-descriptive documents for all sequences of documents is 20%, a successful real-time sharing method can reduce corrective review for the 80% of documents. If rework is not necessary, a real time sharing arrangement may reduce errors in the 80% of documents. Assuming that the review using the existing model was conducted by flipping a coin, the sharing arrangement can reduce overall coding errors and inconsistency rates by 40%. The improvement in review accuracy of the responsive document pool is much more. The real time sharing would also reduce the time for reviewers to struggle. If, for example, a reviewer knows that a particular model number is a non-responsive product, the reviewer quickly makes its coding decision. This knowledge allows the reviewer to code this tag instantly. However, if the reviewer does not know this model number, the reviewer has to read the document and then makes the best guess. Due to gross insufficiency of context information, the reviewer may still make a wrong decision after a careful reading of the document. The precise benefits from the sharing arrangement cannot be accurately determined on per-document basis because many errors and inconsistencies may appear in same documents. In other words, several elementary facts may affect one or more tags for the same document in more complex ways.

Implementing real time sharing of coding rules and elementary facts can also reduce review time for reading difficult subjects. When documents contain complex technologies and difficult issues, the reviewers have to read them. However, if an elementary fact is fully understood and a coding rule concerning this fact is provided, the reviewers need less time to code the documents concerning this fact. If a coding rule is to exclude all employee performance reports, there is no need to analyze sales data in such reports. It is also true that some elementary facts described in documents may be clueless. Some documents may discuss an elementary fact in great details, but do not reveal how it is related to any document requests. The reviewers may spend a great detail of time to figure out this relationship. If a reviewer has done research on an elementary fact and makes a finding, the finding can help the rest of the reviewers in coding similar documents. The sharing of the summaries of issues, discovered facts, player identities, and incomprehensible terms is the best way to save time. If the documents contain hundreds of transaction code names, some of the transactions are responsive, while others have no bearing to the document requests, the sharing of the elementary facts (e.g., the transaction nature) can help the reviewers save time.

Figure 6:
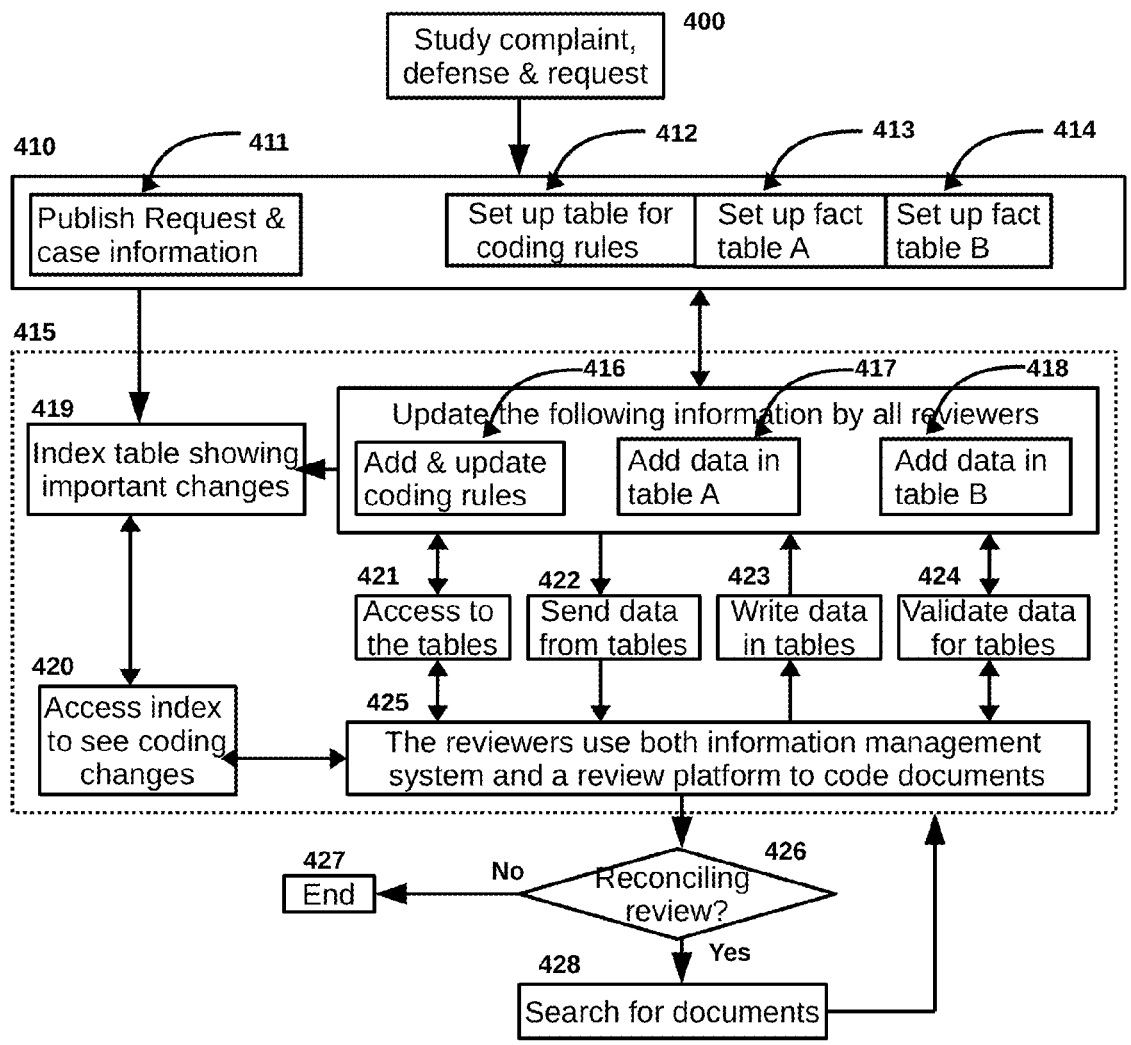
FIG. 6 shows the accurate coding process by using a document review platform and an information management system.

FIG. 6 shows the accurate coding method in an embodiment of the present invention. From the document request, the litigation attorney first studies the request in light of defenses and complaint at Block 400. The system is set up specifically for the case at Block 410. The set-up steps include uploading and publishing the document request and case background information on the server at Block 411, setting up a coding rules table at Block 412, setting up an elementary fact table A at Block 413, and setting up other elementary table B at Blocks 414. The actions at the review process are shown in Block 415, where the coding rules table is updated at Block 416, the data records for elementary facts are added to table A at Block 417 and to table B at Block 418. Document reviewers review and code documents by using both the discovery-assisting system and document review system at Block 425. The document reviewers at Block 425 can access data to any of the tables at Blocks 421, retrieve data from any of the tables at Block 422, write data into any of the tables at Block 423, and validate data for any of the tables at Block 424. The system optionally sets up an index table at Block 419, which can show (1) all changes in elementary facts and coding rules, (2) all the changes in fact tables, (3) all the changes in the coding rules table, or (4) the latest changes. Each of the reviewers may periodically access the index table to view all changes, selected changes or latest changes in coding rules and elementary facts at Block 420. After the first review is completed, the management needs to determine whether a reconciling review is conducted at Block 426. If there is a need to conduct a reconciling review at Block 426, a proper set of documents are identified and retrieved at Block 428 and a reconciling review is conducted according to Block 415.

Real time sharing of basic information requires many unique features. To achieve the intended purpose, the sharing arrangement must meet the following conditions to have practical utility:

(1) The sharing method must be able to handle any of the large number of coding rules and elementary facts such as attorney names, product classification, product nature, common acronyms, and document types. It must be able to accommodate all kinds of potential data.

(2) The method should have the ability to work for different matters. If a system is useful only for one type of case, it is too expensive to develop.

(3) The method should have a simple user interface for retrieving information, adding information, and searching information. Ideally, it should provide features for one-key search, one-key retrieval, and one-form data entry.

(4) The system should have proper means for validating coding rules and elementary facts to insure that coding rules and elementary facts can control the whole team.

(5) The method should have the ability to avoid entering duplicate entry for same coding rules and same elementary facts.

(6) Optionally, all elementary facts should be well structured so that they can be used in a way all reviewers can understand.

(7) Optionally, all discovery information produced in this process can be conveniently backed up in the course of discovery.

Accurate code method requires the preservation of language contexts as much as possible. If documents have been extracted by a search using keys and key matrix and documents are extracted according to search hits, it would be more difficult to achieve coding accuracy. Exclusion of critical fact-descriptive documents or other critical documents from the review pool will make review more difficult. At least improper search algorithms or improper search key matrix may remove documents, which are critical to the accurate review of documents. Whenever a search algorithm removes documents about background knowledge and places each of the documents out of verbal context and business activity context, the reviewers have to code documents by best guess.

Improper document extraction methods may turn a large number of relevant and highly sensitive documents into "non-responsive" when they are reviewed out of language context. The method of present invention may be unable to remedy the effects from disrupting language context. If document assignments totally destroy the verbal context and business activity context, the reviewers may find that a large number sentences are incomprehensible, and thus have to make best guess. This will also decrease review productivity.

The case information may be shared through use of discovery information management system ("discovery-assisting system" or "review-assisting system"). This system has been fully disclosed in other patent application (Ser. No. 12/420,817, now U.S. Pat. No. 8,548,997). This system allows project managers to change the table structures of the database table instantly, and provides two unique data validation schemes to insure that all data in the database are accurate. The disclosures of the prior filed patent application Ser. No. 12/420,817 (now U.S. Pat. No. 8,548,997) is hereby incorporated by reference.

1. Discovery Information Management System Used as Discovery-Assisting System

A discovery information management system includes the following features.

a. Setup and Configure Database Tables

To create a new table, the manager uses a Create Table page. This page contains two input boxes at the top: one for navigation button and one for table name and two buttons: "Insert Entry" and "Delete Entry." Below these two buttons, the page by default shows a data input line (e.g., a row of input boxes) for accepting the definitions of the first field or column of the table. The input boxes in the data input line are respectively for field name, type, length, not-null, and uniqueness.

On the Create Table page, the manager at first sees only one data input line for creating one table column. By clicking the Insert entry button once, it generates one more input line. If the manager wants to create a table containing five columns, the manager needs to create additional four input lines by clicking the Insert entry button four times. If the manager has created too many input lines by mistake, the manager can delete the last line by clicking the Delete entry button once, and can delete as many lines as necessary by clicking the Delete entry button repeatedly.

In creating a new table, the manager first enters a word (such as "Attorney_Name" or "Name") to be used as the name of the navigation button corresponding to the table to be created. This value is to be saved in the special database table Head intended for storing the information about all configurable tables on the server. The manager then provides another word or phrase such as "Names" to be used as the table name, which is also used as the title of the web page for displaying the table. The field name should be one single string without any space. In addition, some words and phrases that have been used by the system cannot be used as a table name.

The manager needs to define all fields. The manager provides a field name and the length. The field name should contain no space and special characters. The types of the field available in the drop-down menu include integer, tiny integer, char, varchar, double, year, date, time, and date and time. The manager needs to use correct data types. "Not null" is a check box, which may be selected if the field cannot be null. Uniqueness is also a check box, which may be selected when the value in a field to be created must be unique, as in case of a field for email addresses. The manager needs to understand when a field cannot be null and when the unique box should be checked.

After the data are provided with correct checks, the form is submitted to the server for processing. If the operation is successful, the server shows the page Setup Tables and Boards page with the newly created table in it. If the server encounters error, it responds with "Error: The system was unable to create board/table, and this maybe due to some wrong fields."

The structure of any of the tables can be modified. By clicking the Modify button on a setup page, the server generates a page titled "Modify Table for [Table Name]" (the Modify Table page). The structure of the attorneys name table could have eight rows of data corresponding to eight fields: email address, first name, middle initial, last name, firm or company, dates, type, and comments. Each row contains a field name, type, a null flag, and a uniqueness flag. There is a check box in front of each of the rows and there are three buttons at the bottom: Delete, Add, and Modify.

If the manager selects a column (e.g., Last_Name) and clicks the Modify button, the server sends a page titled "Modify Columns for Name" for editing the selected field in the Modify Column page. This input line is substantially same as the input line used in creating new table except that all input fields are filled with the original values. Upon submission, the server updates the table structure to reflect the modifications of the field. To add a new field, the manager clicks the Add button, the server sends a page titled "Add Columns for Attorney Name [Table]". After the field names are provided and their types and flags are set, the page is submitted to the server. If the new fields are added successfully, the server responds with the same page except that it has newly inserted fields appended at the end of the table. If the manager deletes a field from a table containing data, all of the data in this field will be lost. The manager is reminded with the risk of losing data. If the manager confirms the deletion, the field together with data will be deleted.

In implementation, all configurable tables are tracked by the table: Head (board_id int auto_increment primary key, group_id int, navigation varchar(15), board_name varchar(20), board_status ENUM('T','F') default 'T', has records ENUM('Y','N') default 'N', validation method_ENUM('0','1','2') default '0', votes int, access rule ENUM('0','1') default '0', create_date timestamp NOT NULL default CURRENT_TIMESTAMP). Board_status is for validation route: T for tentative table, and F for combined table; Validation_method is for validation method: 0 for manager validation, 1 for validation by votes, 2 for both manager validation and voting validation. "access rule" is for the data access rule: 0 for private edit and 1 for public edit.

If the manager has access to the server, a project zip file may be loaded on the system locally by using an equivalent server program, which may be invoked on the server's terminal. In this case, the command may be like "pimport project-file-path." The program in response prompts for project password. Upon receiving a correct password, the program decrypts the zip file, reads data from the resulted files, and writes data into relevant database tables.

It may be necessary to change the whole project's table structures as quickly as possible. This can also be done by uploading and executing a configuration file. On the manager's "Setup Project" page, one button "Reset Configuration by File" is added. Upon clicking this link, the server sends a page for uploading a configuration file. The configuration file contains plural blocks of data in the form of "table_name; navigation_name; table_structure (statements for table structures)." The statements inside the brackets may be a SQL statement or special plain language. The entire line is referred to as a block of definition data for a table. If the statements are in a plain language, they must be translated into a SQL statement for creating a table. It is obvious that a table name and a navigation name may be the same, and any one of the two fields may be eliminated as long as the program knows the convention.

One version of the information management system of the present invention contains integrated tools for resetting all project storage facilities (or configurable database tables) under any of the manager accounts. Project storage facilities can be reset instantly by one of the methods selected from the group consisting of (a) returning the state of the manager account to the system's default setting; (b) deleting all project data without touching the structures of all database tables; (c) overwriting all table structures by uploading a configuration file containing tables structures and necessary definitions; and (d) overwriting specified database tables under the manager account by uploading a configuration file containing plural table structures and necessary definitions.

The system allows project members or users to add information to plural configurable database tables, validate information via different validation routes and by different validation methods, share information among different users in real time, and process information by using interactive server pads, investigative identity data search algorithm ("IIDS"), identity data processing algorithm ("IDP"), and configurable interactive search and data-feeding function.

b. Data Validation Methods

By clicking "Advanced Setup" on the Setup Table and Boards page, the server sends a page titled "Change Navigation Name, Table Name, Access Rule, and Validation Route and Method." The manager can change the navigation name. On this page, the manager can set up or change data validation route with a tentative table or a combined table. The use of data validation route is discussed in next subsection. The manager can also select data validation method in the drop down box. Data validation methods include Manager validation, validation by vote ("voting validation," or "member validation"), and a combination of the two methods. When the manager validation method is selected, the system allows the manager to validate newly entered data records for the table. If the voting validation method or the combination methods is selected, the page opens an input box right below the drop-down box to prompt the manager to type in a numerical value. The number determines the number of votes required to validate each tentative record. The creator of the data record is not counted as a vote by default. If an inputted number is a reasonable integer smaller than the number of members on the project, the system accepts and uses the value as the vote threshold for the table. If the number is not good, the server prompts the manager to provide a new number.

The method for sharing information comprises: (a) adding a data record by a project member into a table as a tentative record, (b) validating the record in a combined table or tentative table by the manager or members' vote, (c) changing the status of the record, (d) moving the data record from the tentative table or the combined table to a validated table, and (e) retrieving the data record by any of the project members for share. Information on this system may be shared by using a simple search method, interactive data retrieving method, investigative identity data search algorithm, identity data processing algorithm, and global search method. As a result, the record created by the member can be found and shared by the rest of the members without the risk of introducing incorrect information into the system.

All of the configurable tables have a view-selecting tool bar, which allows any user to select different views: Validated Table, Tentative Table or Combined Table, and Edit Table. While they are also called as tables, the data on different views of a table actually come from the same database table.

Each of the tables has table name (i.e., a title), a search input box at the top, the table body capable of displaying plural data records, and plural buttons. The number of fields and their types depend on the setup of the tables. The Validated Table has an Enter button, which allows the member to invoke the page for entering data for the table. Each of the column names in the table header is also a link for sorting data records. By clicking a column name such as "Events", "Date" or "Comment" in the transaction table, the user can trigger a JavaScript function to call the server program to send the page with the selected column as a sorting key. Therefore, the server can send the data records that are sorted by any of the configurable and non-configurable fields.

Data Validation route determines where data records are validated. If a configurable table is setup with a tentative table as data validation route, the tentative table shows only the tentative data records while the validated table shows only the validated data records. The tentative table may be referred to as validation page. If the table is setup with a combined table as data validation route, all validated and tentative data records show up in the combined table, while the validated table shows only the validated data records. The combined table is referred to as validation table. The tentative table and the combined table have a check box on the left of each of the data records and have plural buttons below the table.

The number and functions of the buttons on the validation route depend on the validation method for the table and account owner's status. If the table is set up with manager validation only, the bottom buttons on the member's validation page consists of "Enter," "Delete" and "Edit." The member's ability to edit and delete records depends upon the data access rule. The bottom buttons on the manager's validation page consist of "Enter," "Delete," "Edit" (new addition), and "Validate." The manager uses the "Validate" button to validate data records. The manager is allowed to delete and edit data records on the validation page while the member's right to delete and edit data records is limited by the data access rule.

If the table is set up with voting validation method, the bottom buttons on the member's validation page includes "Enter," "Delete," "Edit," "Vote" and "Revoke". The Edit button is added in the latest version so the member can edit records according to the data access rule and it is not shown in all drawings. The manager page has the same buttons because the manager does not need to validate any data records. The manager may cast votes like any member. The buttons are placed on the tentative table or the combined table, depending upon the data validation route that the table uses.

If the table is setup with both manager's validation and voting validation, all six buttons "Enter," "Delete,", "Edit,", "Validate,", "Vote," and "Revoke" are placed on the manager's validation page. The manager can validate data by both validating data records and voting on data records. Five buttons "Enter," "Delete," "Edit," "Vote," and "Revoke" are placed on the member's tentative table page or combined table page, depending upon the validation route used for the table. The manager is allowed to delete and edit data records on the validation page while the member's right is limited by the data access rule.

Despite the complexity of the buttons, all tables must allow the users, manager or members, to enter and edit data records; the manager is allowed to delete any records on both validated table and validation page, but each of the members is allowed to delete his own tentative records if the data access rule is set for private edit or delete any of the tentative records if the data access rule is set for public edit; the manager uses the Validate button on the validation page to validate data records while each of the members uses the Vote and Revoke buttons on the validation page to cast vote or retract vote; and all validation buttons are placed on validation tables where data records are validated.

When data validation route is a tentative table, data records enter into the database table through a tentative table as tentative records. Upon data validation, their statuses are changed so that they appear on the validated table, and disappear from the tentative table. When this method is used, it is easy to keep track of all validated records and tentative records. The other validation route, known as "combined table", allows new records to enter the combined table that shows both validated records and tentative records. However, the two kinds of data records are displayed with different colors in the number field and different values in the APP field. All data records are stored in the same database table with different values in their validation status so they can be retrieved in different table views. They could be stored in two different database tables. This data validation route is useful in the case that the member is interested in seeing all data records, regardless of their validity. When a record is validated in the combined table, its status is changed, it appears in the validated table, but remains in the combined table as a validated record.

The process of data validation for a table depends upon its data validation route and its data validation method. If the table is configured with a tentative data page and the manager validation method, the manager validates tentative records and data validation is performed on the tentative table. On this page, there is a search box at top, the body of the table in the middle, and four buttons: "Enter", "Delete", "Edit" and "Validate" (This table also has the Vote button and the Revoke button because this table is set up with both validation methods). A check box is placed in front of each of the data records.

To validate data records, the manager selects data records to be validated by checking their boxes and clicks the Validate button at the bottom. The browser responds with a pop-up window to confirm the intention. Upon confirmation, those checked records are validated, and they disappear from the tentative table and appear on the validated table. After a record is validated, it cannot be edited or deleted by the member who created it. In implementation, the values in their status fields are changed upon validation, the data records are retrieved, and the page is updated. If the manager does not agree with a record, the manager can delete it by checking the corresponding check box and pressing the Delete button. Deletion is performed by the server upon the confirmation of the intention on a pop-up window. On the page, the Enter button is for calling the data entry page for the table. The Enter button disregards the states of check boxes in front of data records. It could be placed in a different place.

If the database table is configured with a combined table route and manager validation method, the manager can validate data records by the similar operations on the combined table rather than on a tentative table. In this case, the combined table contains both validated and tentative data records. However, they are displayed in different ways. Each of the validated data records in the attorney name table has a black number in the number field and a manager's initials in the APP field. In contrast, each of the tentative records in the same table has a red number in the number field and an empty value in the APP field. Any other suitable methods may be used to mark the two kinds of records so that they are distinguishable. The manager can find all tentative records by using the search function at the top of the table if the manage knows the records. The manager can also use the page number navigation controller at the bottom to reach the pages where tentative records are.

If project data validation route is a tentative table, all new data records are shown on the tentative table but only validated data records are shown in a validated table. If data validation route is a combined table, all new data are entered into a combined table where all validated records and tentative new records coexist. However, all tentative records in the combined table are marked in a different color and look. If the project member wants to view only validated data records, the project member can view the validated table. The combined table allows a project member to search both validated or tentative records at once. When a tentative table is used, the project member must conduct two searches, one for the tentative table and one for the validated table. However, search tools for both validated and tentative data records can be implemented to cross the two table views, but this implementation may be confusing. A search, which initiates from a page for one type of data records but include data records from another table view, can confuse project members.

As discussed in the section for project manager, two validation methods are used for validating data records. The process of validating data for a table by vote depends upon validation route for the table. If the table is set up with a tentative table, data validation is performed on a tentative table; and if the table is set up with a combined table, data validation is conducted on a combined table. A record is admitted to the validated table as a validated record when a predetermined number of members have voted for the record. The project manager can set and change this predetermined number. The voting validation method can reduce the burden on the manager.

When a table is set up with voting validation method and a tentative table, the tentative page contains a search box at the top, a body of the table, and four buttons at the bottom: Enter, Delete, Vote, and Revoke. There is a check box on the far left column on the table header and there is a check box in front of each of the records. To cast a vote on a record, the member selects a record by clicking the front check box, and clicks the vote button. The server takes and saves the vote after member's confirmation as shown in dialog window. The number of the records on the web page becomes green so that the member knows this is a record the member has voted on. The member can revoke his or her vote before this record is admitted as a validated record. Upon being revoked, the number of the record becomes black again on the web page. Two more members, member B and member C, also cast their votes on this record in the same way on the tentative table under their own accounts. When the last of the members successfully cast the vote required to validate the record, the status value of the record is changed. The record disappears from the tentative table, and appears on the validated table. If the member opens the validated table, the member can see that the newly validated record is marked with VOTE in the App field and date and time in the confirm_date field. If the manager opens the table in the validated table view, the manager can see all members' votes by clicking its record number. The identities of all voters can be ascertained from their initials. Therefore, the manager knows who has voted for this record. One database table for holding record status in one version of the embodiment may contain the following fields: board_id int, record_id int, usr_id int, vote status ENUM('0', '1','2','9','10') default '0', [where 0=no action taken", 1=voted, 2=revoked, 9=validated by manager, and 10=validated by vote] vote_date varchar(100), revoke date varchar (100), access date varchar (100).

c. Edit Table Function

A function, known as table edit or Edit Table, is provided for editing plural data records on a table view. The system provides two kinds of data access rules: public edit and private edit. If the table is set up with public edit, a member can delete any of the tentative records by using the Delete button. If the table is set up with private edit, the member can delete only the member's own tentative records but is not allowed to delete the tentative records created by other members.

To edit tentative records in any of the configurable tables, the member clicks the Edit Table button and calls the page for editing data records. This page allows the member to delete any record, create a new record at the end of the table, enter data for a newly recreated input boxes for a record, copy data from an existing record and paste the data onto any existing record, and update the data in the database table.

On this table, there are a search box at the top on the right side, the body of the table containing plural rows of data records, and a link "Enter Record" right at the end of the body. Each of the data records may have plural data fields or columns, depending upon the table's setup. Each of the data values is shown in one editable input box. If a record in the table has five fields, it has five editable boxes. On the left of each of the records, there are three very small menu icons, respectively, for copy, paste, and deletion. Each of the icons indicates its function whenever the mouse is moved over it. For example, if the mouse is moved over the first icon, the browse shows "Copy" below the mouse's arrow. At the bottom are two buttons: "Save Changes" and "Discard Changes." The page also has a page number navigation controller. The column name is also a link for calling a sorting function using the field as a sorting key as implemented in all configurable tables.

When access rule is set to private edit, a member can see only his own records on the Edit Table page. Therefore, it is impossible to overwrite any data records of other members. The access rule is applicable to specific tables and their relevant views. To delete a record, the member just clicks the deletion icon on the left of the record, the record will be deleted from the table, but has not permanently written the change to the database table. To enter data at the end of the table, the member first creates a line of input boxes for accepting an empty record at the end of the table by clicking the "Enter Record" at the table bottom. The member can type data into the boxes for the record and save the record by pressing on the Save Changes button. If the member wants to copy data from an existing record to this empty record, the member clicks the copy icon on the left side of the record, and pastes the data onto the empty record by clicking the paste icon for the empty record. Of course, data can be copied from any existing record and pasted onto any of the exiting records. Selecting individual data fields is not necessary for copying and pasting a whole record. However, the member can copy data from one data field to another by the conventional method of selecting and copying data and pasting the data to where the mouse is.

To make permanent changes to the database table, the member clicks the Save Changes button. All changes are saved. If the member does not want to save the changes, the member can click the Discard Changes button. The data in the web table are not written into the database table. Use of the search function will cause the server to retrieve the original data records, reconstruct a web page, and thus cause the client computer to discard the changes. Preferably, conspicuous instructions are placed on the web page to warn the member that navigating pages, conducting a search, and sorting data records will cause the server to discard all changes made on the table. In the alternative, a JavaScript function is implemented to throw a warning message whenever the member tries to use the searching or sorting function or to change the page number after the data on the table have been edited.

d. Interactive Search Feature

Any of the data fields may use a static data source or one or more table fields of one or more of configurable tables as a data source.

Assuming that the input box for comment field on the edit table page for the transaction table has been set up with fixed data choices as a data source. The data choices include "draft agreement," "public record," "press release," "personal communication," and "email." The member uses the Edit Table page to enter data. When a member creates an empty record and moves the cursor to the comment field and types, the server sends all the retrieved data choices and displays them in a dynamic selection box below the input field. If the member moves the cursor to the phrase "Personal Communication" in the selection box and releases it, the phrase is moved into the input box.

If the data source contains a large number of records, the server can be set up with the ability to progressively narrow down data choices for the input box. If the member types the letter "e", the selection box shows only data pieces starting with letter "e". In this case, it shows only "email." If the member types in "ab", the server would display nothing because no data record starts with letters "ab."

Assuming that the manager has set up both transaction table and Notes tables and used the event field of the Notes table as the data source for the event field of the transaction table, when the member types in the input box for the event field of the transaction table, the keystroke causes a JavaScript program to call one of the server's search programs with the key, table names, and field names as parameters. The server program searches the event field of the Notes table, retrieves all data that match the typed letters, and displays them in the selection box for the member to select. The member can select any of the suggested data pieces as input data. If no data record is found, the member can type in suitable data. This function not only increases data entry efficiency but also improves data consistency.

This feature also allows the member to hunt for possible data by typing in various letters in an active input box. Due to the setup feature, it is extremely flexible to use. Moreover, the project manager can change the data source for any active field any time by reconfiguring the data source. However, this function requires a sufficient computing power. It is preferable that the selection box has a page number navigation capability or scroll bars when the total number of suggested data choices is excessively large.

2. Application of Discovery Information Management System

Database tables to be created for a second request review may include coding rules, player names, acronym and terms, relevant products, optional transactions, and optional index table. Database tables to be created for a patent infringement case may include coding rules, player names, acronym and terms, products, sales transactions, and optional index table. Database tables to be created for a commercial bribery review may include coding rules, player names, gifts and moneys, compliance actions, and optional index table. Database tables to be created for a shareholder class action against their board members may include coding rules, player names, board meeting and actions, damages, and optional index table. Database tables to be created for a product liability action may include coding rules, player names, communications and knowledge, damages, and optional index table. Those examples show the most likely table structures. However, unique litigation issues, peculiar case nature, and document composition may require different tables with different table structures. For example, a huge corporation may have several hundred of code manes and some code names are critically important to issues at litigation, then a dedicated code name table may be set up. A person skilled in litigation would know how to best structure tables for each particular case. The discovery-assisting system allows litigation attorneys to add tables, delete tables, and modify tables to accommodate unexpected changes and all unknowns found in the documents during review. Elementary facts are entered into respective dedicated tables or a shared table. For example, attorney names, party names, and other key players are entered in the names table.

For an attorney who reads the request and knows the case, selection and designing of tables are obvious. Project instructions and requests can be published in the Instruction tab. Illustrative images showing the tag selection configuration (how tags are selected under various circumstances) may be published in the Instruction tab. By using graphic illustrations, the potential misunderstanding of tagging selection configuration can be minimized. The project manager can change tag selection configuration by updating this attachment.

The coding rules with effects at document levels are stored in the coding rules table. The example table structure for coding rules is shown in Table 1. Coding rules are written for specific types of documents. Each rule must be sufficiently fine and detailed that it cannot be interpreted in different ways. Coding rules should meet the following guidelines.

(1) Each coding rule should be fine and detailed enough to specifically refer to document type. An exemplar document may be provided by using bates or control number.

(2) The main entry (or the main data field) for each rule should be the common name and document title if they are reasonably short. If common name and document title are too long, the most important key words for the document may be used and those words should appear in the document so that all documents containing this key can be found by search. For example, "sales data" may be used to refer all kinds of sales data. The long title may be included in the comment.

(3) If a long document contains a large amount of irrelevant materials, the entry in the main data field may be one or more key words for the relevant substance. For the sales data in a K-10 report, the entry might be like "sales data, k-10." In this case, both words may be proper search keys for finding this and all similar documents.

(4) Action types include "original," "amended," and "settled." Additional designations may be added for specific purposes required in different cases.

(5) The comment should contain information for accurately identifying the related documents, the reason for using the rule, its operation scope, and other critical information. It is highly desirable to cite a real document by bates or control number. If the name in the main field is not proper, the reviewers can find the coding rule by searching comments so that the coding rule may be modified or an amended rule may be added to the coding rules table.

Coding rules are the instructions for coding decisions for specific documents or elementary facts. For example, a coding rules table may contain the following coding rules.

TABLE 1

Table for Coding Rules for a Second Request Review

| Subject | Code | Effect | Date* | Comments |
|---|---|---|---|---|
| Sales data | NR | O | Jan. 01, 2009 | Sale Performance in performance reports. |
| Annual Sales | R | O | Jan. 02, 2009 | Those data are primarily for relevant products BAT-2121. |
| Annual Sales | NR | A | Jan. 05, 2009 | All annual sales data are NR. |
| Annual Sales | R | S | Jan. 10, 2009 | All annual sales data concerning [. . .] are R. |
| Income and Profit | NR | O | Jan. 01, 2009 | Company-wise income and profit report. |
| Income and Profit | R | O | Jan. 01, 2009 | Income and profit report for X division. |
| Income and Profit | NR | A | Jan. 10, 2009 | Income and profit report for X division. |
| Performance Report | NR | S | Jan. 10, 2009 | The report generally contains sales data and refers to certain products, (S) per party agreement. |
| Commission Calculation document | NR | O | Jan. 01, 2009 | See example BAT-232323. |
| Daily Sales Report | R | O | Jan. 02, 2009 | IF it mentions relevant products. |
| Daily Sales Report | NR | O | Jan. 02, 2009 | IF it is for non-relevant products in general. |
| Income & profit | NR | S | Jan. 26, 2009 | All income & profits are NR, effective immediately. |
| Sales reports, spreadsheet | NR | S | Jan. 01, 2009 | Sample in Bat-0011111, NR by settled agreement. |
| Web contact log | NR | O | Jan. 01, 2009 | Sample in Bat-002222. |
| Trade News | NR | O | Jan. 01, 2009 | Trade News about this industry. |
| Trade News | R | A | Jan. 01, 2009 | News published by XYZ concerning telecommunication products, market shares of XYZ, and relative competitiveness of XYZ. |
| PRO-211, PRO-212, power tools | NR | O | Jan. 01, 2009 | PRO-211, PRO-212, power tools are removed from the relevant products. |
| PRO-600, power tools | R | S | May 01, 2009 | PRO-600 are added as relevant products, per agreement. |

*The server data should contain the accurate time in seconds.

This table shows many coding rules for many specific types of documents and changes to the coding rules. First, the coding rules directly affect the coding decisions of difficult documents. Documents such as profit reports, sales documents, commission calculation reports, and performance reports exist in large numbers. Other documents such as commission calculation reports may specifically mention relevant products, but may have little use in antitrust analysis. The coding rules should reduce a substantial portion of coding inconsistencies. Second, this table, due to the way of operation, provides a clear-cut time line for each of the changes. The change dates should include actual time in seconds. When a change in a coding rule is made, the change takes place real time. It is easy to identify the documents coded before the change and the documents coded after the change. If there is a need to revisit the previously coded documents, the table can be used to identify those documents. The law firm can use this table to study change histories. This table accurately explains coding inconsistencies and reasons for all changes. This table indicates that the relevant products defined in the initial request have amended in a second phrase of review. The request dropped out some relevant products, but added new relevant products. This table indicates that some apparent errors are actually the result of negotiated settlement and risk-taking decisions. Third, this coding rules table is very helpful in a future review. This table may contain hundreds or even thousands of entries, depending on the nature of the case and the size of documents. This coding rules table preserves all critical discovery decisions, negotiated coding rules, amended coding rules, and critical work products. It is the work product that the entire review team might have worked for several months to several years. By reviewing this table, the future litigation staff is able to understand great disparities in coding, coding logic, and risk taking-decisions. The detailed coding rules can help future litigation attorneys formulate a new plan for future additional discovery. If the case is remanded and the client needs to find certain documents, the law firm can figure out how to conduct additional review.

Coding rules and certain elementary facts affect the entire review term. Thus, the coding rules and elementary facts must be authoritative or correct. The discovery information management system provides two kinds of data validation methods real time. Any data entries may be validated by managers or by reviewer's vote. Generally, coding rules directly control the coding decisions while elementary facts are provided to assist the reviewers with critical facts they do not know. The coding rules may reflect strategic decisions, negotiations and compromise, motion rulings, and other changes. Those changes do not have to be correct legally, technically, or logically. A litigant may take chance for doing so. The client and law firm can always choose to litigate it to avoid production of unnecessary and harmful documents. Two parties can also change normal discovery rules on what should be produced or what should not. The right to add or change coding rules may be rested in project managers and litigation attorneys. An additional step validation of coding rules may be used to ensure that they are proper.

Subject to exceptions in specific cases, elementary facts are just facts that any reviewers collect from reviewing documents, verbal context, or by combining the substances in different documents. There are a great deal of elementary facts which can help reviewers code documents in one way or the other, but they generally do not specifically instruct them to make a definitive coding decision. The tasks of gathering elementary facts are ordinarily performed by document reviewers and thus may be entrusted to them. Therefore, elementary facts may be entered by reviewers and validated by reviewers using the voting method.

In a case that is less contentious, the law firm may delegate the data validation task to experienced reviewers or a plurality of reviewers. The reviewers may be instructed to selectively create and validate coding rules. If a coding rule reflects litigation decisions and has significant effects on the whole review team, such a coding rule should be reserved to litigation attorneys. If a coding rule has only limited effect and does not require weighing risks and benefits, the right to validate it may be rested in experienced reviewers. This arrangement can be used to reduce the burden on litigation attorneys. This class of less important coding rules may be related to attorney representation capacity, affiliation of persons with entities, the identities of governmental officers, the roles of third parties, and identities of specific relevant products. If a coding rule is concerned with purely technical matter or basic fact, the right to enter the coding rule may be delegated to reviewers and such a rule may be validated by a fixed number of reviewers. This class of coding rules may be based upon meanings of technical jargon, the meanings of strange notions and expressions, recurring strange spellings, and the meanings of words and phrases. Normally, two or three votes should be good enough to confirm such coding rules.

The discovery-assisting system must be able to reduce the overhead cost in searching for coding rules, elementary facts, and other helpful information. Such a system must deliver results in one key search. If a reviewer is unable to make a decision on sales data, the user enters just one word "sales," the reviewer should see all relevant rules on sales data. It might have five to ten types of sales data. The user can quickly identify relevant coding rule and code the document accordingly. If a reviewer consistently experiences difficulty in coding trade news, the reviewer can find and compares all coding rules on "trade news." Thus, this reviewer gains benefits from the work done by other reviewers.

When a reviewer types in the interactive search box for the coding rules table, it causes the server to search source fields, retrieves data, sends retrieved data to the server, and displays the retrieved data in a dynamic selection box for the reviewer to open this record. The field uses the data stored in the field as a data source. Assuming that the input box for the Event field has been set up with the main field as data source, when the reviewer types in the event field, the server searches and retrieves data pieces in the event field, sends data pieces to the client computer, and displays them in a pop-up selection box. If the reviewer moves the cursor to a data piece in the selection box and releases it, the data piece is dropped into the input box. If the data source contains a large number of records, the reviewer can progressively narrow down data choices for the input box. The search algorithm should ignore articles in the fields. If a reviewer type "s", it retrieves "the sales table", "a sales report," "a staff report" and "a staff meeting." If the reviewer types "st," it retrieves "a staff report" and "a staff meeting." Interactive search method is a matured art, which can be implemented by using different technologies such as Ajax and remote scripts. They can be modified to meet those specific requirements.

Further improvement can be made to improve global search capacity. It would be desirable to implement interactive global search feature on this system. By using the feature, the reviewer can interactively retrieve potential data records from all database tables. When the reviewer finds a entry, the reviewer moves cursor over entry and releases mouse, this will cause the server to send the selected record and display the full record below the interactive search box. This feature allows the reviewer to try different keys while seeing the interim records. This function requires high computing power and the review facility should provide ample bandwidth. For best results, the system may be hosted in a local network with high network speed. The discovery-assisting system does not host a large volume of data and there is little need for technical staff to access. If such a system is hosted on the Internet, interactive search may be less ineffective.

The discovery-assisting system must have a method for determining when to enter a record in the coding rules table and any other tables. This is normally clear from reviewer's point of view. This can be showed in the following examples.

Example 1

Identification of Lawyers

A reviewer ran into a document revealing a suspicious attorney, but could not determine whom the lawyer worked for. A search in the names table returned no record. Thus, the reviewer knew the identity of the person had not been resolved as of that point. Later, the reviewer saw a retaining agreement, a billing statement, or a statement mentioning "I will send my draft to client X for further comment." At this point, the reviewer knew who the lawyer worked for and this was a critical fact in determining privilege for all related documents. The reviewer tried to enter this attorney name in the name table with the document ID. Since the fact alone does not require the reviewer to make a definite coding decision, it should be entered in the names table. This newly entered record is a tentative record, but the correct citation of the document ID would allow other reviewers to validate this elementary fact.

Example 2

Identification of Infringing Products

In a patent infringement action, one of the tasks is to identify alleged "infringing" products. A party might have hundreds of products and each of them may have a unique brand name, product model code, serial number, common name, and informal name. A document may refer to a product by one of the terms. A reviewer encountered a model number. A search in the system using this model number returned nothing so the reviewer had to code some documents by best guess. The reviewer later encountered a document, which discusses this product and its relationship with the patent-in-suit. At this point, the reviewer knew it is an alleged "infringing product." The reviewer thus decided to enter this elementary fact. At this point, the reviewer found another reviewer had just entered a tentative record concerning the nature of the product. Therefore, the reviewer had no need to enter a duplicate record. However, the reviewer cast a vote for that tentative record to verify the fact.

Example 3

Bribery Investigation

A reviewer ran into a document revealing a highly suspicious person who is identified by a strange email address. The email was not found in the names table. Other emails revealed small bits of information: one email revealed that the person had certain medical problems; one email indicated that the person had a vacation to play golf, and one email reveals that the person recently lost a lot money and needed "financial help in a big way." Several experienced reviewers entered pieces of information about this person by using the same email address. One reviewer later ran into a document that described several board members. One of them owned great equity interest in the company and his company lost substantial stock value. Another document showed that this board member had won golf titles in various golf events. Whether an investigator could find the identity of this suspicious person would depend upon if the review team could identify all those leads. If they collected all useful leads, an investigator might be able to find the person who had a medical problem, was a noted golf player, and had financial problems. By reviewing four corners of documents literally, and dismissing all documents on face, the review may be a total waste of the client's resources.

Example 4

Identify of Critical Terms

Certain terms are so unique and distinctive that their appearance in documents can be distinctive evidence in support of certain coding decisions. One request in antitrust clearance is the research and development effort in relevant products. The relevant products are concerned with certain wireless technology. Among R&D documents, the topics are often directed to code division multiple access (CDMA), time division multiple access (TDMA), and frequency-division multiple access (FDMA). If the reviewer understood the terms and how they were related to the relevant products, the reviewer only needed to ensure that the documents concerned the real substance of the technologies. If this fact affected documents in limited scope, it could be entered in the terms table. If the term helped the reviewers to make a definite decision for considerable documents, it should be entered as a coding rule in the coding rules table.

Example 5

Identification of Code Names

Companies often use code names to refer to sensitive company matters. Code names have been used to denote research and development projects, pipeline products, asset purchase transactions, mergers and acquisitions, personnel actions, government inquiry, civil actions, criminal investigations, administrative actions, and audit programs. When a code name is used in documents, the reviewer needs to know the nature of the transaction denoted by the code name. Code names may be entered in the acronym and term table or coding rules table. For a large corporation, code names may be entered in a dedicated table. Each code name may be associated with a few sub-level code names. Some sub-level code names may be entered as separate records if they can appear in documents without the main code names. If a unique code name can compel reviewers to make a definite coding decision, it should be entered in the coding rules table.

Example 6

Identification of Incomprehensible Terms

Many times, documents may be written in informal, distinctive, or even wrong expressions. Such expressions may be found in a series of similar documents. In documents created by a foreign writer, the names may be spelled contrary to acceptable conventions and words may be misspelled. Due to cultural differences, a term expressed in a native culture may become strange term if it is translated verbatim into English. One example is that a person is called "thief babe" in Chinese. In the Chinese culture, this name is used to name a child in an effort to increase its survival chance. It means neither thief's baby, nor a thief-like baby. When such a name appears in documents, it must be given its cultural meaning. In multiple-national cases, terms with cultural meanings are common. They have found their ways to human names, business practices, and product names.

Those examples show the need to resort to materials outsides the document for interpretation of the words and phrases in documents. The four-corner construction rule never means to provide the convenience of ignoring words and phrases that the reviewer cannot understand. Otherwise, the review cannot achieve the objective of finding truth.

3. Integrated Review System

Figure 7:
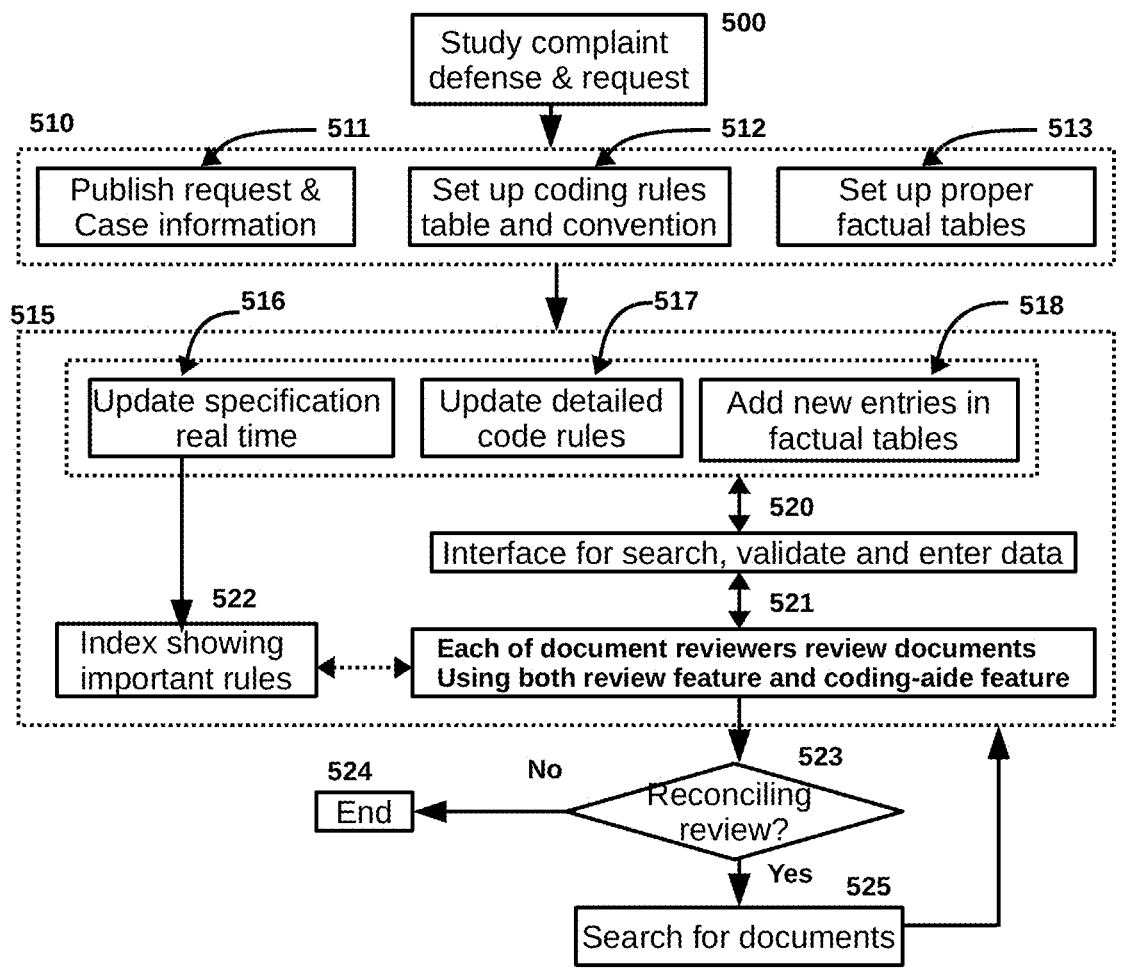
FIG. 7 shows the accurate coding process by using a document review platform integrated with unique information sharing features.

An alternative method is to integrate information-sharing features shown in FIG. 7 into any existing document review platform. This method is intended to make the system simpler. All concepts discussed are equally applicable unless it is incompatible or modified below. The concept is that all coding rules and elementary data are stored in one table that is implemented with interactive search feature, global search feature, and data entry feature. FIG. 7 shows the detailed steps for this second embodiment. From the document request, the litigation attorneys first study the request in light of claims and defenses at Block 500. The management sets up the system for the specific case at Block 510. The set-up steps include publishing the request and case background information at Block 511, setting up a coding rules table and coding conventions at Block 512, and setting up other fact tables for storing elementary facts at Block 513. Those tables may be virtual or logical tables if data are stored in one database table. The basic actions in document review is shown at Block 515, where the management updates the document requests or specifications at Block 516 and updates detailed coding rules from time to time at Block 517, while each of the reviewers add elementary facts in the fact tables at Block 518. All of the critical changes are optionally published in an index table at Block 522. During the review process, each of the reviewers at Block 521 uses a discovery-assisting user interface 520 to access requests at Block 516, the coding rules table at Block 517, and factual table at Block 518 while reviewing documents. Each of the reviewers may also periodically access the index table 522 to see all changes, selected changes or latest changes in coding rules and elementary facts at Block 522. After the first-round review is completed, the management determines whether a reconciling review is conducted at Block 523. If reconciling review is to be done at Block 523, a proper set of documents are found and retrieved at Block 525 and a reconciling review will be conducted as in Block 515.

To set up a coding rules table and factual tables, the manager needs to think what kinds of coding rules and elementary facts should appear in the table. The table would depend upon the case and the document request. For example, the table for a second request case may be as follows:

TABLE 2

Table for Showing Coding Rules and Elementary Facts

| Subject | Virtual Table | Scope Effect | Coding Effect | Date | Comments |
|---|---|---|---|---|---|
| Sales data | Coding | O | R | Jan. 01, 2009 | Sale Performance in a performance report. |
| Apple, John | Names | O | Attorney | Jan. 01, 2009 | Black and White LLP for the client. |
| T. J. | Names | O | Partner | Jan. 01, 2009 | Director of Marketing, of the client (to be updated). |
| tbx@law.com | Names | O | Client | Jan. 01, 2009 | In the negotiation of Green transaction for the client. |
| White, John | Names | O | Other | Jan. 01, 2009 | Government official in the stock action. |
| Lee, Trouble | Names | O | Other | Jan. 05, 2009 | Employee of Competitor, XYZ corporation. |
| Annual Sales | Coding | S | NR | Jan. 05, 2009 | All annual sale data are NR. |
| Annual Sales | Coding | S | R | Jan. 10, 2009 | All annual sale data for Division X are responsive. |
| Income and Profit | Coding | O | R | Jan. 02, 2009 | Company-wise income and profit report. |
| Income and Profit | Coding | O | R | Jan. 02, 2009 | Income and profit report for X division. |
| Income and Profit | Coding | A | NR | Jan. 10, 2009 | Income and profit report for X division. |
| Performance Report | Coding | O | NR | Jan. 02, 2009 | The report generally contains sale data and refers to certain products. |
| Commission report | Coding | O | NR | Jan. 01, 2009 | See example BAT-232323. |
| Sale Report, daily | Coding | O | R | Jan. 02, 2009 | IF it discusses relevant products. |
| Sale Report, daily | Coding | O | NR | Jan. 02, 2009 | IF it is for non-relevant products in general. |
| Income & profit | Coding | A | NR | Feb. 01, 2009 | All income & profits reports are coded as NR, effective immediately. |
| Sales data, spreadsheet | Coding | O | NR | Jan. 01, 2009 | See document at Bat-0011111. |
| Web contact log | Coding | O | NR | Jan. 01, 2009 | See document at Bat-002222. |
| Trade News | Coding | O | NR | Jan. 01, 2009 | Trade News about this industry. |
| Trade News | Coding | O | R | Jan. 01, 2009 | News published by XYZ concerning the telecommunication products, market shares in XYZ, and relative competitiveness. |
| CDMA | Terms | O | N/A | Jan. 01, 2009 | Code division multiple access is the underlying technology related to the relevant products. R&D efforts for CDMA are responsive. |
| FDMA | Terms | O | N/A | Jan. 01, 2009 | "Frequency division multiple access", R&D on this topic is not responsive. |

TABLE 2-continued

Table for Showing Coding Rules and Elementary Facts

| Subject | Virtual Table | Scope Effect | Coding Effect | Date | Comments |
|---------|---------------|--------------|---------------|------|----------|
| Virus, complaint | Coding | O | R-3 | Jan. 01, 2009 | The vulnerability to virus infection affects competitiveness of relevant product. |

The first column, also referred to as the main field, contains the identities of coding rules or elementary facts. The second column is a table designation (virtual or logic table), which is equivalent to a main entry classification. Possible values for this column depend upon the case and document request. For most cases, the values include coding, names, and terms. The third column defines the scope effect of the data record, and its values define whether the data record is original, amended, or settled. Those statuses may be denoted by "O," "A," and "S." Obviously, "settled" is generally available to coding rules only. The fourth column contains data indicating coding effect. The values for coding rules are "R" and "NR," respectively, for responsive and non-responsive. In this case, they have control effect on coding decisions for the type of documents identified. If documents are coded specifically for all request numbers, the coding value "R" may be affixed with a request number. For example, R-1,2,8 means that the document controlled by the coding rule is coded as responsive to requests 1, 2 and 8. The values for elementary facts in the coding effect column depend upon its table value, and affect coding decisions by operation of facts. For example, sub-types, attorney, client, partners, and third party in the names table will affect privilege coding and responsiveness coding under various circumstances. There is no need to enter index here. The index table in a web view is formed from extracting coding rules records and elementary facts from the database table.

This integrated discovery assisting feature should be designed to have universal applications. The manager can set up table types. Different cases might require different table types (i.e., virtual table), and different tables require different coding effect types and sub-types. Table value such as "coding" may be used as a filter to retrieve all coding rules for export. The "terms" type may be used to retrieve all terms from the database table. By using convention, even a same table may be used to store different data. For example, products and transactions may be combined in one virtual or logic table. The data from this table can be exported as dedicated table. Data from dedicated table can be imported into this database table.

Table 2 just shows a combination of many independent tables used in the discovery-assisting system discussed for the first embodiment. A person skilled in litigation can modify this table for different cases. By using one single table, global interactive search, global search, and data entry can be implemented more efficiently by using a discovery-assisting user interface. It reduces the overhead to constantly open and close several database tables. It, however, reduces the flexibility to set up sophisticated table structures. However, most of the details can be put in the comments field. The ability to import data from and into the table will also be more difficult. Utility tools can be developed to import existing names table, terms table, acronym table, product table and transaction table into this table. In retrieving data, the reviewers have fewer options to specify the ways of retrieving data. An effective global search method allows the reviewers to find any of the records. Since this table may contain hundreds of records to tens of thousands of records, sophisticated search and sorting methods are not required. Advanced search and sorting methods may be implemented for special uses.

The discovery-assisting user interface for this table has three integrated functions. First, interactive search function allows each of the reviewers to quickly determine if a particular coding rule, name, or term exists in the table. The user interface may be placed on the document listing pane, the document review pane, or a separate pane. One exemplar location is shown in Block 140 in FIG. 1. An interactive search and feeding input box may be directly placed in place of the button or link so as to reduce one click.

Figure 8:
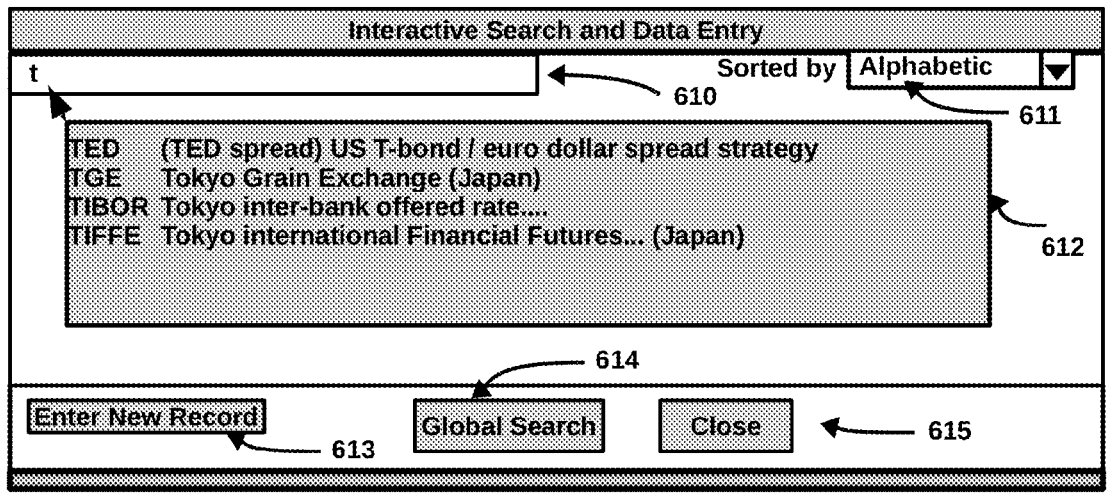
FIG. 8 shows an interactive search and a global search page in the discovery-assisting user interface.

FIG. 8 shows an example interactive search page. It has an interactive search box 610, a sorting selecting box 611, a selection box 612, a global search submission button 614, and a switch button 613 for switching to a data entry page. In conducting interactive search, the system searches the main field although the search program can be modified to search several or all fields. If the interactive search feature is set up for searching all fields, the search program can send only partial records to be displayed in the selection box 612. It is desirable to show the portion of the text containing the typed letters so that the reviewer can determine which data record is selected for display. For example, if the reviewer types "CDMA" in the interactive search box 610, a record is returned because its comment field contains the typed key. This record may be displayed in the selection box 612 as "R&D, effort: Coding; O; R; this class of documents are directed to only the CDMA technologies . . . . " When this display method is used, sorting methods will lose their meanings. If the scope of interactive search is limited to the main field, the sorting control 611 can be implemented. For best result, both search and display methods may be implemented by default, but the project manager can configure search and display methods for any project. For investigation cases, the project manager may select a global interactive search scope in setup. For other cases, the interactive search scope may be set to the main field only. The feature is similar to what has been discussed above.

Figure 9:
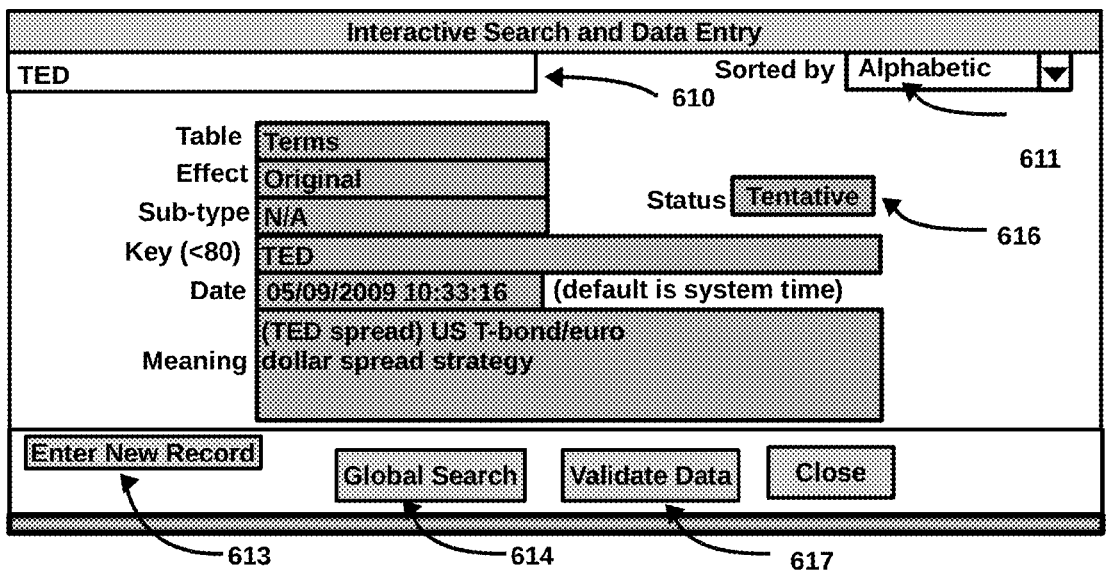
FIG. 9 shows a search result from an interactive search after the user selects an entry in the dynamic selection pane.

In designing the discovery-assisting user interface, the key consideration is that each of the actions, interactive search, data retrieval, and data entry must be performed as efficiently as possible. It should not consume too much desktop space, but provide maximum convenience. The operations should not interrupt review workflow. If the reviewer finds one or more records, the reviewer has the option to select one record to be displayed, as shown in FIG. 9. At this point, the server gets the whole record, updates the page, and displays the selected record below the interactive search box 610. FIG. 9 shows the record, which has been found from searching the key "TED." When a record is found and displayed, this page shows its data validation status 616. In addition, this page also shows a "Validate Data" submission button 617. On this page, the reviewer has three options. The first option is just to review the record and dismiss it. The second option is to read the record and validate it by clicking the "Validate Data" button 617. If the reviewer is non-privileged reviewer, the validation method is a voting method. A clicking of the button with a pop-up confirmation is counted as one vote for validating the record. If this vote is the last vote required to validate the record, the server will automatically change its validation status (which are indicated by different colors and notation) upon the casting of the vote. The principles and methods are fully disclosed in several related patent disclosure of Discovery Information Management System. If the reviewer is a privileged reviewer, the reviewer just validates it by clicking it. The third option is to do more searches. If the record does not help, the reviewer can do another interactive search in the same search box or use the key left in the search box 610 from the last interactive search to conduct a global search by clicking the global search button 614. This button is for submitting the form to a different search program, which conducts a more comprehensive search. It may search this table, discussion table, personal server pad table, and instructions and guidelines, to find all records containing the key. Upon receiving the search request, the server gets the value of the key, checks its data formality, uses it to conduct a search, and returns found data records.

Figure 10:
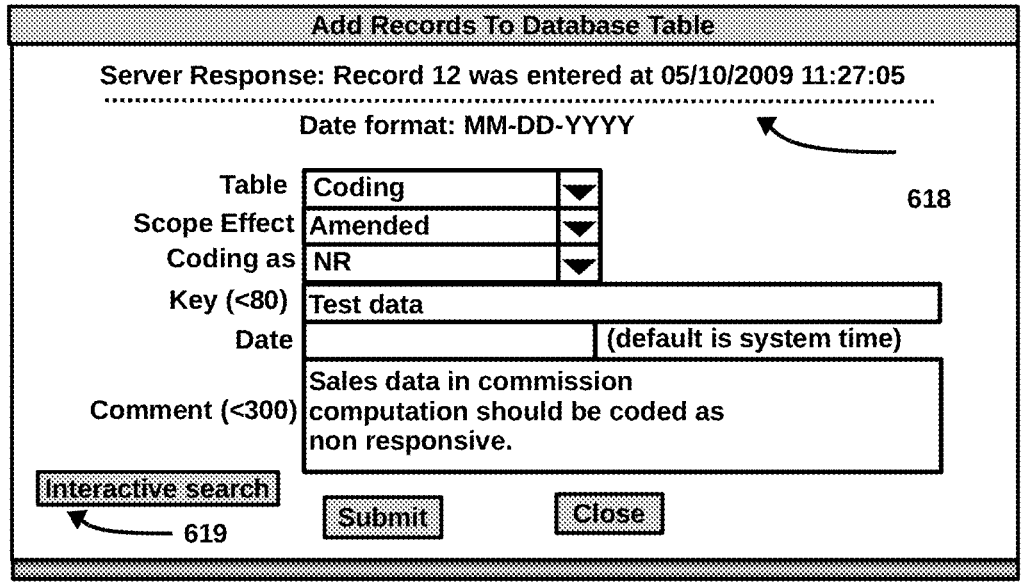
FIG. 10 shows the web page for adding a data record to a coding rules table after the data record has been opened from the Enter New Record button on the discovery-assisting user interface in FIG. 8.
Figure 11:
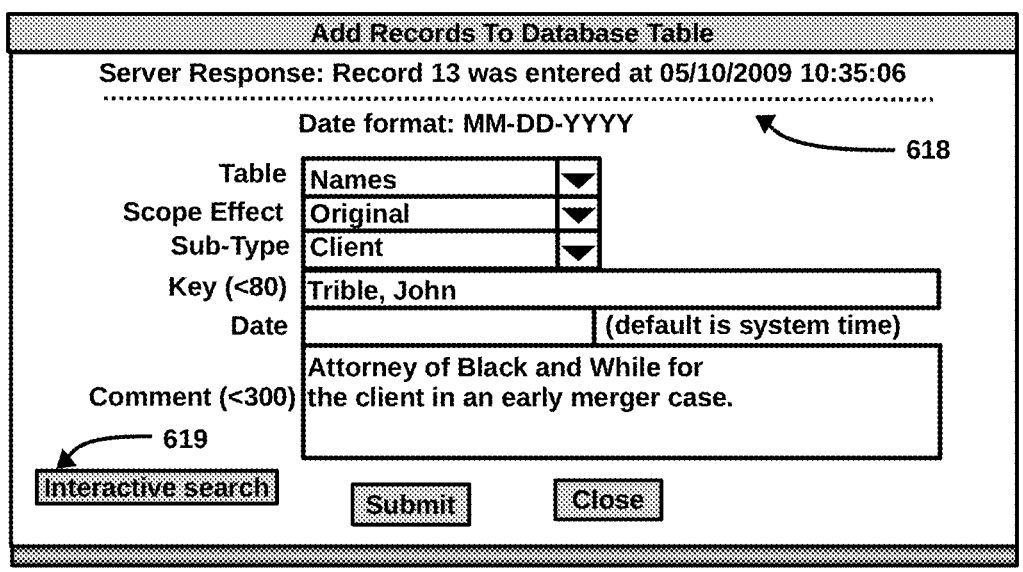
FIG. 11 shows the web page for adding a data record to a database table.

If a reviewer runs into a critical fact-descriptive document and acquires useful information, which may assist other reviewers in coding documents, the reviewer may enter a coding rule or an elementary fact in the table. The reviewer types in the interactive search box one or more keys to make sure that the same coding rule or elementary fact has not entered in the table (FIG. 8). If the reviewer finds nothing, the reviewer clicks "Enter New Record" button 613 to open a data entry page shown in FIG. 10. This page contains a switch button 619 for switching back to the interactive search page. To enter a new coding rule, the reviewer first selects "coding" for table type and selects value "Amend" and "R", respectively, for the effect field, then selects the coding/sub-type field depending on what is selected for the Table field, and then enters data for the main field, the date field, and the comment field. The reviewer may enter specific date as the effective date, or use the default system time as the effective date. When the reviewer submits the page, the same page shows a server action message 618 with the form cleared for next data entry (Note that server message is for a prior record while the data for a new record have been entered in FIGS. 10, 11, 12. for convenience of discussion). This message shows a record number and entry time for the last entry so that the reviewer knows if the last record has been entered successfully. If the reviewer enters a name (See FIG. 11), the reviewer selects "names" for the Table field, selects "original" for the scope effect field, selects "employee" for the coding effect or sub-type, then enters name, date and comment in respective fields, and submits the form to the server. To enter a term or acronym, the reviewer selects the terms in Table field, selects "original" for the scope effect field, enters effective date if necessary, types the term and a comment in the respective fields, and submits the filled form to the server. In each of the cases, the server processes the form, gets the data, checks date format, connects to the database, and writes the record in the database table.

The data entry form (FIGS. 10-12) has six fields but may contain fewer or more fields. The reviewer must select the table type in the first Table field. It has a drop-down box for the reviewer to select table type. For a given table type, the reviewer can select coding effect or sub-type for the selected table. For a name, the sub-type may include attorney, employee, partner, and other parties, which affect coding decisions in privilege and relevancy review. The table type can be used to select only certain types of data. For example, "coding" may be used to retrieve all coding rules, "names" may be used to find all player names; and "terms" (or acronym) may be used to find all terms and acronyms. Coding rules are also used for reconciling review.

The coding effect field in the database table may contain a composite data for coding rule. For example, the entry might be "C-R-O," "C-R-O," "C-N-A," and "C-R-A," where the first letter means coding rule, the second letter means coding decision (N=non-responsive and R=responsive), and third letter means effects: "original," "amended," and "settled." Those words are combined to reduce field number and save storage space. If all status words are implemented as independent fields, some fields are not be used in terms. Regardless of how those statuses are implemented in the table, they should be displayed in the most convenient view for the reviewers.

If a record for a coding rule or an elementary fact exists, but the reviewer wants to amend the rule or the fact, the reviewer can just interactively retrieve the record, open it, edit it, and submit the edited form to the server. On this page (FIG. 10), the user may select a status "original," "amended," and "settled" as the values of scope effect. The server may automatically treat such a record as amended rule and the system automatically assigns "amend" if the reviewer has not chosen one. It should be noted that available options for coding effect and sub-type depend upon the table type. If names is selected, the coding and sub-type would be "client," "attorney," "partner," "other party." and optional "opposing party." The reviewer may use the global search if the reviewer wants to conduct more thorough searches.

The table is implemented with the validation status. To save display area, the validation statuses may be hidden on the table's web view and are shown in different colors of the main entry. In addition, their statuses may be indicated by using notations or distinctive background colors. Thus, the reviewers would know if a record has been validated and whether the reviewer can validate a particular record. The status data may be shown as a separate column in the table 3.

The sharing of dynamic critical information is not enough because the sharing method only reduces certain kinds of errors and inconsistency. The system should provide real time review instructions and updated coding instructions. Use of illustrative coding map can effectively reduce the risk of porting different coding logic into the particular project. The coding map should be drawn in a way to reduce undesirable effects of the importing reviewers' experience and knowledge into the current project. This graph should contain default rules for each type of documents and options to alter the default rules as shown below.

TABLE 3

Instructions Showing Default Rules, Options and Exceptions to Default Rules for Privilege Review (a few examples only)

| Subject Matter | Default Rules | Option Out | Exceptions to Default Rules |
| --- | --- | --- | --- |
| Draft contract | [ ] P | [X] NP | [ ] P only if it has definitive evidence of lawyer's involvement in email, Mata data, and text. |
| Press Release | [X] NP | [ ] P | [ ] P only if is concerned with the XWZ transactions. |
| Privileged email sent to business | [X] break up | [ ] Does not break | [ ] the email does not break privilege if it is sent to [. . .]. |

TABLE 3-continued

Instructions Showing Default Rules, Options and Exceptions to Default Rules for Privilege Review (a few examples only)

| Subject Matter | Default Rules | Option Out | Exceptions to Default Rules |
|---|---|---|---|
| partners | privilege | privilege | |
| Email sent to attorneys and many employees | [X] NP | [ ] Tentative P | [ ] P only if the author asks for legal advice expressly. |
| Email reveals no more what is required to lodge it | [X] NP | [ ] Tentative P | [ ] P only if the message concerns [. . .] or sending to or from [. . .]. |
| Email sent to lawyer with FYI | [X] NP | [ ] Tentative P | [ ] P only if the subject is obvious that the sender made an implied request for legal advice. |
| Email relayed to lawyer | [X] NP | [ ] Tentative P | [ ] P only if the subject is obvious that the sender made an implied request for legal advice. |

The actual map used at a review site should contain a concise but comprehensive default coding rules. Each type of documents may be treated differently on different review sites due to differences in the nature of case and litigation strategies. The litigation attorneys cannot assume that reviewers can follow a lengthy discussion or oral instructions. Normal rules are the rules that most law firms follow under normal circumstances. The use of default rules, reversal default rules, or exceptions can be justified by certain factors, which are not on documents. The following are two examples:

Example 7

Draft Contracts

The key factor, which is not disclosed in the draft contract, is corporate drafting practice. In some companies, every contract is drafted by legal department, and its legal department is involved in every step from sending model draft, negotiating over terms, reviewing terms, editing drafts, and signing off. In this case, the client can defend a privilege claim by showing its general practice or by specific instances of drafts even though it may be costly to challenge and defend a privilege claim. In other companies, every draft contract is drafted by a group of well-trained employees. While those people might sometimes seek legal advice, they do everything in drafting contract. In this case, the default rule should be non-privileged. In many cases, there might be exceptions. For example, all settlement agreements are drafted by outside attorneys. In this case, the presumption is that draft settlement agreements are privileged.

Example 8

Email Sent to Lawyers and Employees

In determining privilege of email sent to attorneys and employees, one must determine if the message is intended for seeking legal advice. When an employee sends a message to five people, it may be for information only. However, it is also possible the email is sent to solicit a comment. In many cases, one, or several recipients do make comments as to what to do. In some cases, attorneys do respond with legal advice. The communication pattern seems to show that at least for some sensitive matters, the sender seeks advice from both business people and lawyers. In one case, email sent to an attorney and four employees are coded as not privileged. In another case, email sent to an attorney and fifty employees is coded as privileged. The communication patterns, the nature of the information, and the rankings and roles of the employees play differential roles in the determination of privilege.

Review instructions should be written in a way to minimize different judgments caused by reviewers' personal knowledge, work experience, and case knowledge. Whenever a major error happens, the penalty to the client will be much severer. A good review instruction should be designed in light of the review industry general practices. The objective of review instructions is to minimize the room for misunderstanding. All words and phrases in request definitions are subject to different interpretations. "Dummy privilege review" means different things to different reviewers. Descriptive words such as "hot", "significant", "clearly privileged", "relevant", and "responsive" all means different things to different reviewers. Even objective words such as "article," "legal instrument," "financial data," "draft contract," "public statement" and "board minutes" are subject to different interpretations by the reviewers in front of a broad spectrum of corporate documents. Reviewers can understand their clear meanings, but after they read documents, they are unable to tell whether they really "understand" their scope.

A document may concern anything between its non-existence and its existence or concern any stage of a thing developing from its non-existence to its existence. "Invoices" is a word everyone understands. In most corporation documents, hundreds documents in different colors and shapes may be related to invoices. It is unclear if this term includes billing statements, draft invoices, receipts, banking documents showing payment, amendments to price, security documents, and descriptions of transaction indicating of the payment. There are all kinds of documents that are between invoices and non-invoices. It makes no sense to produce a document titled as "invoice" but reject one containing same information except it has different name. A corporation may create hundreds of varieties of documents on "Financial data." Financial data may appear in sales summaries for days, weeks, months, quarters, years, and multiple year period, budget forecasts for different groups, products, and divisions, financial forecasts for different products, different periods, different groups, and different purposes. Financial data may also appear in routine employees performance evaluation, bonus computation, company restructure, and even personal resumes.

A brief written or oral instructions without indicating unique facts and clear intention to depart from common practices is ineffective to change reviewers coding habits. When the litigation attorneys do not want to follow common practice, and apply a different rule or exceptions, it must be presented in a sharp contrast with common practices or default rules. To further reduce coding errors, the coding rules for common documents and specific substances should be standardized. The coding instructions may be presented in small pages with cited reference number. Detailed explanations are provided in the training manual with reference numbers. After the standards are set and reviewers understand the standards, they can code documents with improved accuracy.

FIG. 13 shows search result from conducting a global search from the interactive search page. It has a search key input box 620 and a drop-down menu 621 for sorting found records. In the interactive search window shown in FIG. 8, the user types in a key "txt" and then clicks the Global Search button. The server sends this search result page.

Further improvements can be achieved by using an index table as shown in FIG. 14. It has a filter 622 to select types such as coding rules, names, terms and transactions. The index table is one web-based table showing all changes and recent changes in coding rules or elementary facts. This table should allow each of the reviewers to see changes in coding rules and elementary facts by using the filter 622. Optionally, it can show all records in the table. The reviewer can find latest changes by opening the index table and taking a look at the table. The reviewer should see latest changes in the index table each day before the start of coding documents. In addition, the reviewer may see records by different sorting methods such as normal entry dates and times, reversal entry dates and times, alphabetic order, and reversal alphabetic order.

After a first round of review is concluded, the document product inevitably contains coding errors and inconsistency. Errors may be the result of reviewers' true mistakes and changed coding rules during review. An inconsistency is the differences in coding similar documents under the same coding rule. If resource permits, a reconciling review may be conducted to further reduce coding errors and inconsistency. In the traditional review model, a second review and a quality control review are normally conducted to improve consistency. Under this review method, only certain documents are selected for a reconciling review.

A document pool for a reconciling review can be created by searching all documents using a key word of the coding rule and proper variants, and identifying the documents that were coded before the date of the coding rule. If "sales data" are key words in documents, and a relevant coding rule was changed at time=t, the documents coded before time=t are coded differently from the similar documents coded after time=t. The system searches and retrieves those documents containing "sales data" and other potential keys and select those that were coded before time=t. If the coding rule for a particular substance has been changed twice, at time=t1 and time=t2, the system searches and finds all documents containing the key and other suitable variants and selects those documents coded before time=t2. If the words "sales data" in the main entry of coding rules are properly search keys, they can be used directly. If a coding rule is named by a descriptive word, proper search keys must be used to retrieve all potential documents. Generally, it is not proper to use tag value to retrieve documents because many documents might be coded as non-responsive. If the coding rules for different requests are changed many times, the system must find all those documents, which might be affected by all changes in coding rules. A reconciling review should focus on the following situations.

(1) Coding inconsistencies before a coding rule is placed. Before a coding rule is provided, reviewers might use their best judgments in coding documents, and documents containing the same or similar substance may be coded differently.

(2) Coding inconsistencies as a result of changes in coding rules. Certain documents were coded according to an early coding rule. Later, the coding rule was amended, and all documents that contained the same substance were coded differently. If coding decisions did not depend upon other substances, their tag values are conflicting. The tag values for the previously coded documents should be changed accordingly.

Reconciling review may be conducted for documents which are affected by changes in elementary facts as implied by FIG. 7. Also, as shown in Example 4, an elementary fact may also be entered as a coding rule.

Reconciling review may be subject to any discovery agreements. During discovery, the litigation attorneys may negotiate with the requester to properly determine the request scope. The requester may consent to a narrow reading of a particular request or avoiding reading on specific substances. The requester may consent to the change to the scope prospectively or on the conditions of producing previously coded documents as of the date. If a change is unconditional, the change in the coding rule can be treated in normal cases. If a coding rule is changed with a condition, all previously coded documents are part of the agreement.

F. Utilize Experience and Useful Knowledge

Accurate coding method of the present invention provides only a methodology that can be used by the reviewers to achieve the highest coding accuracy in the most efficient way. Review accuracy cannot exceed what the reviewers can deliver. Identifying hot issues and skillful treatment of bad issues also depend upon reviewer's experience. Thus, skills, experience, knowledge of reviewers are the key for success, and they cannot be over emphasized. Document review is complicated because each of the tasks is unique, underlying technologies are diverse, and document compositions are complicated. Documents contain overwhelming case information. Further complications come from document requests, complex tag structures, numerous legal issues, coding exceptions, and review platform problems. In document review, the reviewers need to look out for all kinds of legally significant facts and issues.

Document reviewers start with learning basic case information. The learning process for experienced reviewers is different from that for inexperienced reviewers. All reviewers have to learn basic case facts, review instructions, and review platform. Experienced reviewers can go through this process faster because they do not need to learn everything of review parameters. They only need to learn case facts, and the unique or different things in review procedure, background law, substantive instructions, review platform, tags structure, and coding conventions. In a second request review, experienced reviewers might have known most of the two dozens requests. They only need to learn those unique requests, and they are familiar with market shares, sale prices, costs of saving, benefits analysis, any antitrust sensitive issues. They know the basics for conducting privilege review, and thus do not need to spend time to develop new skills for applying requests to documents, and do not need to spent time to learn everything about the review. It is far less likely for them to make fatal errors under reasonable review speeds. Experienced reviewers may know short-cut methods for conducting relevancy analysis and privilege analysis.

In comparison, inexperienced reviewers have overwhelming new things to learn. Those things include case facts, review procedure, background law, review instructions, review platform features, tags structures, coding conventions, and analytical methods. They have to develop skills for conducting legal analysis, applying requests to the documents, and developing necessary skills to perform complex analysis. Inexperienced reviewers may make coding errors as a result of using a wrong approach in conducting legal analysis.

For cases such as patent infringement action, background knowledge is very important. Law firms routinely use technical advisers and expert consultants to address technical issues. In discovery, the need for technical knowledge is not any less. Reviewers, who are neither trained in the technical field, nor provided with technical assistance, cannot competently understand technical matters in documents. In patent cases, reduction to practice, patent misuse, relevant prior art, and inequitable conduct are not subject a reviewer can master in a brief training or on one or more review projects.

Many important facts and legal issues are first spotted in document review. Thus, the experience of reviewers is particularly important in spotting significant issues that the litigation attorneys and clients are unaware of. Sometimes, certain issues are spotted outsides intended review scope. Experienced reviewers will be in a much better position to identify documents in support of claims or defenses.

All reviewers cannot reach their full potential for a considerable period of time. One of the reasons is that they cannot master everything. Their review flow may be interrupted because they have to address less frequently encountered facts, terms, expressions, things, people, and places. For example, if a company has used two thousand of attorneys, the reviewer has known about fifty of them, who appear frequently. The reviewer is unable to remember most of the attorneys who appear in documents infrequently. Whenever the reviewer encounters those unfamiliar attorneys, the reviewer needs to check them against the name list. In addition, they have to deal with issues such as illegible documents, handwritten notes, foreign languages, compressed files, password-protected documents, large spreadsheets, database files, and web pages.

Experienced reviewers have their own peculiar "liabilities." Due to insufficient review guidelines, experienced reviewers may import the meanings of the common terms such as responsive, significance, privilege, and technical issues into the current review project. Importation of foreign interpretation rules can directly compromise the review objective. Tagging logic and coding conventions are different from sites to sites, and written review manuals seldom contain sufficient details to alert the reviewers with critical differences. A typical review manual contains a huge number of interpretation gaps. Experienced reviewers may fill all voids and gaps by what they learn from other sites. They might port knowledge from prior procedures, substantive definitions, and interpretation rules, coding rules, and tag configuration. As a result, they might code documents contrary to the intended ways.

Some quality control data may reveal that experienced reviewers perform worse than inexperienced reviewers. There are several reasons for this observation. Experienced reviewers tend to read requests more narrowly and pay attention to the substance. Thus, they exclude more documents. Inexperienced reviewers would read definitions more broadly and pay more attention to the literal meanings of requests than the substance. For example, experienced reviewers with litigation background may exclude documents that merely mention a relevant product without real substance. Some examples of irrelevant subjects might include product logo, a mere mentioning of package configuration, the delivery date of relevant products, a mere mentioning of shipping method, a mere mentioning of payment method, and a mere statement on transit state. There might be hundreds of types of documents. By reading requests literally, the reviewers can squarely read on those documents. However, those substances are meaningless from antitrust point view when they do not include sales volume, sales prices, costs, or any indication of anti-competitiveness. They may reflect one or more steps of business plan, but they are not the kinds of documents the requester can extract any useful information. If those documents are coded as privileged, the substance is insufficient for creating a log entry. Such a log entry would invite an unnecessary challenge to the privilege claim. The litigation may force the client to disclose more than what is in the documents.

Over-inclusion of non-responsive documents is a common problem under the current review model. The Department of Justice could return documents on the ground that the document production contained too many irrelevant documents. An incidence like this clearly suggests that relevancy should be determined based upon substances. Due to the differences in construction philosophy, it can be anticipated that documents coded by inexperienced reviewers may have good consistency, the documents coded by all experienced reviewers may also have good consistency, but the documents coded by both inexperienced reviewers and experienced reviewers may have poor inconsistency. When the quality control staff takes a literal approach to determining relevancy, experienced reviewers will be the minority. Accordingly, a great percentage of tags of experienced reviewers might be viewed as "errors."

When the industry lacks an objective standard, the "error" rate based upon subjective manager's review or a second review is not a good measure. Production of excessive responsive documents by literal reading has become the norm because it is the easiest way to produce documents. This eliminates the need to make a hard determination of relevancy. Producing non-responsive documents substantially increases the chance to compromise trade secrets, customer information, and strategic business plans. Sometimes, a business plan for non-relevant products may be disclosed by a plurality of non-responsive documents. None of available measures such as protective order, confidential stamp, and non-disclosure agreement has the same level of protection of business secrets as withholding them. In a private litigation between two competing corporations, the client has the strongest incentive to keep out every non-relevant document. In the drug industry, disclosure of strategic plans on pipeline drugs may destroy the company. Clients in other industries may share the same interest to keep non-responsive and sensitive documents from being produced.

Absolute coding inconsistency has little meanings. The main contributions to inconsistencies are improper requests, strategic changes, high review speeds, and different coding philosophies. Good consistency alone is meaningless if production pool contains a large number of non-responsive documents and the review yields little critical information. On the other hand, poor inconsistencies, especially in the privilege log, may invite unnecessary challenges or give the adversary a weapon to complain. In highly contentious cases, the goal is to produce only legally required documents but keep non-responsive documents. Reasonable consistencies may reduce the risk of challenges. Considering the legal obligations and the client business secrets, most clients have a stronger interest to keep non-responsive documents from being given to their competitors.

For all above reasons, experienced reviewers should be sought to improve review accuracy and to improve the chance to handle critical facts and issues. In selecting reviewers, consideration should be given to (1) the reviewer experience in reviewing similar cases, (2) the reviewers knowledge of the underlying technologies, (3) the reviewers experience in using review platforms or similar platforms, and (4) the review substantive legal knowledge.

G. Other Factors Affecting Document Review Performance

The accurate coding method of present invention provides the best chance to achieve high performance. However, review performance also depends upon four other factors: selection of reviewers, performance incentive, document conditions, and review speeds.

The professional conflict rules and agencies conflict rules have facilitated the formation of a review industry in favor of new and inexperienced reviewers. In selecting reviewers, little efforts are made to further the client's cause. Conflicts rules have been broadly used to exclude reviewers for having worked for opposing law firms. Some conflicts check processes require candidates provide detailed information on every case they ever worked. Such a conflict policy effectively excludes experienced reviewers. The intensive competition among staffing agencies has created a document review industry where the client's interest is ignored. The only thing important is to win staffing contract. Contrary to all other industries, reviewer selection is not based upon educational levels, experience levels, relevant education, performance level, task nature, and the requirement of special skills. No attempt is made to evaluate legal and technical backgrounds. If an agency does, it uses GPA and school reputation as a selection criterion or uses a fifteen-minute test to evaluate qualifications. In selecting reviewers for foreign language document review, no reasonable effort is made to determine reviewers' language capacity. Foreign language reviewers are asked to pass a fifteen-question "magic" test in the target language made by an unrecognized vendor. Native speakers are asked to pass a language test administered by non-native persons. Reviewers with long experience, technical background, and talents may be excluded for trivial reasons. What is important is to find candidates at the earliest time to secure staffing opportunities. The agencies look for reviewers who will not make any "troubles."

Document reviewers may be dismissed for any trivial reasons. Most reviewers just want to stay on review projects by coding whatever number of documents they are asked. When a reviewer is dismissed after six months, it would take six months to train a new replacement reviewer. The new reviewer will go through the same learning process to pick up case information and all related details, and will repeat the same kinds of coding errors. When an entire review team is dismissed, the client pays an ultimate price. Under such retention policy, the reviewers care only about pay rates, project duration, work hours, and daily numbers. They have neither financial rewards, nor occupational benefits, nor professional reputation to gain from making positive contributions. Under this retention practice, no reviewers have incentive to make positive contribution and the method is destined to fail.

The review industry does not provide any incentive to improve review performance. The pay rate for document reviewers is about one tenth of the billing rate of a first year associate. Pay rate structure does not take into account their experience levels, working knowledge, and actual contribution. An earning at about or less than $70K does not provide enough incentive for them to stay. New graduates may take document review as transition jobs. Some attorneys may provide document review services only when they do not have enough cases in their own practice. Generally, document reviewers take such jobs as contract attorneys. They may be offered with certain benefits such holiday pays, insurances, and other benefits. They cannot get real benefits because they do not work for the minimum period of time required for receiving benefits. The only incentive for them is to work overtime. However, excessive overtime can significantly reduce review productivity. The current pay structure does not help the client cause.

The prevalent quota practice in this e-discovery industry has more than enough force to defeat the method of the present invention. When the reviewers are demanded or "expected" to code certain number of documents per hour, they are only concerned with daily document numbers rather the quality of review. They have even less incentive to dig into documents to find something to share with the rest of the team. The quota system, which is based upon the personal daily numbers, is totally in conflict with the spirits of helping each other in a team environment. Any quota system, whether it expressed or practiced in a retention policy, will totally defeat the method of the present invention.

Finally, the preservation of document language context will affect the performance of the disclosed method. When only a small set of documents is pulled for review with language context completely disrupted, a large of number of documents may be incompetent for review and the reviewers have to code them by guess.

In those exemplary embodiments of the present invention, specific components, hardware parts, arrangements, and processes are used. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A method for improving document review performance for a legal proceeding or legal matter by a plurality of users or document reviewers on client computers connected to a server, the method comprising steps of:
dividing elementary facts into a plurality of table types or main types and sub-types, and setting up at least one table for storing coding rules and elementary facts specifically for the proceeding or matter, each of the coding rules having an effective date, and each of the elementary facts having an effective date;
generating a document review user interface for each of the users on the user's client computer so that each user can review documents on the document review user interface;
generating a discovery-assisting user interface for searching and retrieving data from the at least one table and for adding data to the at least one table, the discovery-assisting user interface being used by the users who review documents; and
reviewing documents in a sequential order by each of the users, coding for each document, and saving coded data for each document on the server,
wherein, each of the users, after reviewing a document and before coding for the document, uses the discovery-assisting user interface to search coding rules and elementary facts from the at least one table, retrieves one or more coding rules and elementary facts for guidance, and coding the document and/or adding a coding rule and/or an elementary fact in the at least one table for immediate access.

2. The method of claim 1 wherein the discovery-assisting user interface for the at least one table is generated by a separate information management system run by a separate server.

3. The method of claim 2 further comprising steps for generating an edit table web page for editing data records from the at least one table, adding data records in the at least one table, deleting existing data records from the at least one table, copying and pasting data records, changing data records, and/or saving new and changed data records in the at least one table.

4. The method of claim 1 further comprising a step of validating an existing data record for a coding rule or elementary fact by a user's click on a validation button or by casting a vote.

5. The method of claim 1 wherein the discovery-assisting user interface for the at least one table is generated by the server.

6. The method of claim 5 further comprising a step of validating an existing data record from the at least one table by clicking a button or by casting a vote on the discovery-assisting user interface.

7. The method of claim 2, wherein some of the users have user privilege to enter elementary facts while other users have user privilege to enter, edit and validate coding rules.

8. The method of claim 1 further comprising a reconciling review for the documents which are selected by using words used in coding rules and elementary facts as keys to search previously reviewed documents, and by selecting those documents that were coded before effective dates of respective coding rules and elementary facts.

9. The method of claim 1 further comprising a step for generating an index table which shows latest changes in coding rules and elementary facts so that each of the users can immediately know all changes and latest changes.

10. A method for conducting document review by a group of users on client computers connected to a document review system, each client computer being used by one of a group of users, the method comprising steps of:

customizing at least one table for storing coding rules and/or elementary facts specifically for any particular legal matter or legal proceeding;

generating a document review user interface for each of the users reviewing documents;

generating discovery-assisting user interface, which comprises an interactive search page, which is able to display a data record a user has selected during an interactive search, and allows each user to validate data records, enter data records, and/or conduct global searches; and retrieving data records from the at least one table, associating a data-validating submission button with a data record on a search result page, validating data records for the at least one table, and adding data records to the at least one table, wherein, each of the users uses the discovery-assisting user interface to interactively search coding rules and/or elementary facts from the at least one table, retrieve found coding rules or elementary facts for guidance, and coding for documents under review by using the document review user interface and/or add coding rules or elementary facts in the at least one table for real-time share with the other users.

11. The method of claim 10 further comprising a step of identifying documents for reconciling review, wherein documents are found by searching previously reviewed documents using one or more words used in the coding rules or one or more words in the elementary facts as search keys, and selecting those documents with coding dates being before the effective dates of respective coding rules and elementary facts.

12. The method of claim 11 further comprising a step of conducting a reconciling review for the identified documents.

13. The method of claim 11 further comprising a step of adding new type of elementary facts to the at least one table during review.

14. A combination of document review method and discovery-assisting method, being used by a group of users or document reviewers for document review, the method comprising:

a document review method comprising delivering documents to client computers, coding documents on the client computers, and saving coded data on a server; and a discovery-assisting method for distributing coding rules and/or elementary facts to the client computers of the users in real-time by using a discovery-assisting user interface, wherein, a first user enters a coding rule or an elementary fact in at least one table based upon information the user has acquired from reviewing one or more documents, and a second user searches coding rules and elementary facts in the at least one table and finds the coding rule or the elementary fact and uses it as guidance in making a coding decision for a different document, whereby the information that the first user collected in the coding rule or elementary fact is passed to the second user.

15. The method of claim 14 further comprising a step for the first user to enter a coding rule or an elementary fact in the at least one table and a step for one or more other users to validate the coding rule or elementary fact by clicking a validation button or by pressing a voting button to cast a vote on the discovery-assisting user interface.

16. The method of claim 14 wherein at least one of the users is a privileged user and other remaining users are ordinary users, and the privileged user has authority to enter and validate coding rules while ordinary users have authority to validate elementary facts.

17. The method of claim 14 further comprising a step for conducting a reconciling review according to coding rules and elementary facts.

18. The method of claim 15 further comprising a step for adding new type of elementary facts for the at least one table during review.

19. The method of claim 15 further comprising a step for exporting elementary facts and coding rules for backup or future use.

20. The method of claim 15 further comprising a step for generating an index table which shows latest changes in coding rules and elementary facts so that each of the users can quickly see all changes and latest changes.

* * * * *